United States Patent [19]
Nojima

[11] Patent Number: 5,925,170
[45] Date of Patent: Jul. 20, 1999

[54] ELECTRIC DUST-COLLECTION UNIT AND AIR-CLEANING APPARATUS USING THE SAME

[75] Inventor: Kouzaburou Nojima, Tokyo, Japan

[73] Assignee: Kabushiki Kaisya O-DEN, Tokyo, Japan

[21] Appl. No.: 08/840,455

[22] Filed: Apr. 18, 1997

[30] Foreign Application Priority Data

Apr. 23, 1996 [JP] Japan ................................ 8-101173

[51] Int. Cl.⁶ .................................................. B03C 3/40
[52] U.S. Cl. .................................... 96/71; 96/97; 96/100
[58] Field of Search .......................... 96/97, 100, 71–73, 96/55, 57, 70; 29/411; 95/78; 264/DIG. 48, 241; 55/DIG. 38, DIG. 5, DIG. 36

[56] References Cited

U.S. PATENT DOCUMENTS

| 2,604,183 | 7/1952 | Richardson | 96/85 |
| 3,144,881 | 8/1964 | Sproull | 138/117 |
| 5,055,115 | 10/1991 | Yikai et al. | 96/97 X |
| 5,456,741 | 10/1995 | Takahara et al. | 96/97 X |

FOREIGN PATENT DOCUMENTS

| 2 031 704 | 12/1971 | Germany . |
| 54-34676 | 8/1952 | Japan . |
| 56-939 | 1/1981 | Japan . |
| 58-116059 | 8/1983 | Japan . |
| 61-107957 | 5/1986 | Japan . |
| 2-40021 | 3/1990 | Japan . |
| 4-27908 | 5/1992 | Japan . |
| 6-92343 | 4/1994 | Japan . |

OTHER PUBLICATIONS

Patent Abstracts of Japan, vol. 15, No. 392 (C–0873), Oct. 4, 1991, JP 03 161059, Jul. 11, 1991.
Patent Abstracts of Japan, vol. 96, No. 5, May 31, 1996, JP 08 024709, Jan. 30, 1996.

Primary Examiner—Richard L. Chiesa
Attorney, Agent, or Firm—Oblon, Spivak, McClelland, Maier & Neustadt, P.C.

[57] ABSTRACT

An electric dust-collection unit including needle electrodes for the purpose of charging particulates within the air by causing corona discharges around their tips, collector cells (collector electrodes) arranged in tubular shape corresponding to the needle electrodes for the purpose of attracting and collecting the charged particulates by static electricity, and deflecting electrodes which are arranged in such a way as to be inserted within the collector cells for the purpose of imparting a deflecting force on the charged particles in the direction of the collector cells. The deflecting electrodes being configured in the form of a hollow column including a forward plate section having a mounting hole for the purpose of fitting and retaining the needle electrode, and side plate sections facing the collector cell at a prescribed distance. While the needle electrodes are fixed on to the forward plate sections of the deflecting electrodes in such a way that their tips protrude from the surface of the forward plate sections, while their bodies are inserted firmly in the mounting hole.

11 Claims, 27 Drawing Sheets

FIG. 27 (a) PRIOR ART
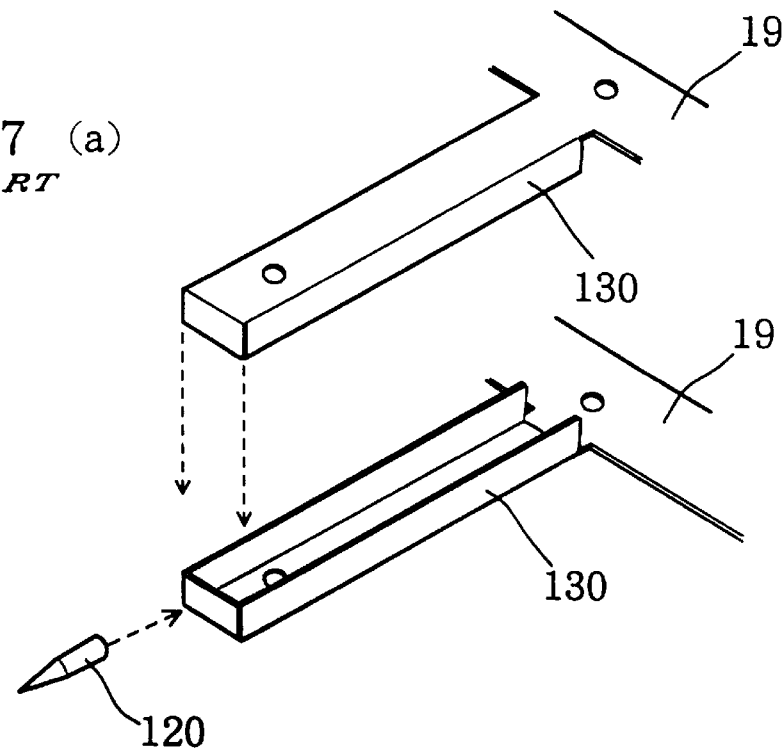
FIG. 27 (b) PRIOR ART
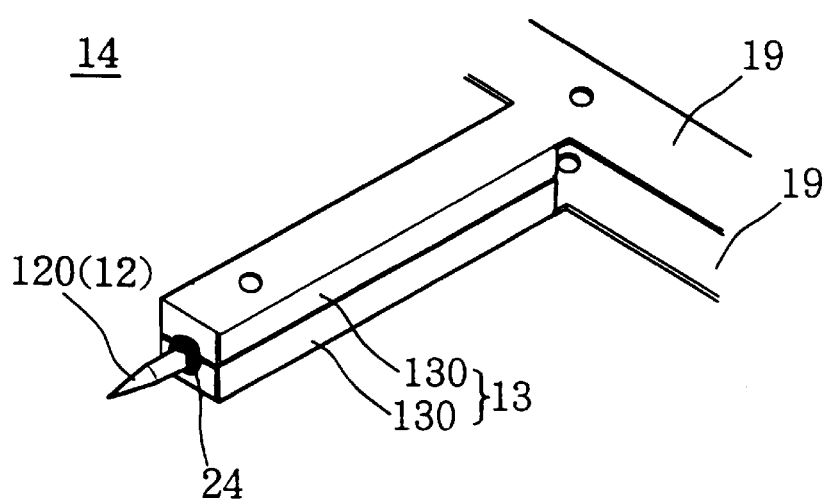

ELECTRIC DUST-COLLECTION UNIT AND AIR-CLEANING APPARATUS USING THE SAME

BACKGROUND OF THE INVENTION

1. Field of the Invention

The present invention relates to an electric dust-collection unit, and method of manufacture, together with an air-cleaner, electric dust-collection device and exhaust smoke removal device employing that unit.

2. Description of the Prior Art

The increasingly air-tight construction of offices, restaurants, technical installations, homes and other buildings (hereinafter referred to representatively as 'offices') of recent years has not only meant that air contaminated with dust (suspended particulates) from cigarette smoke, toner, paper and other sources, foul odours and similar harmful substances exercises a detrimental effect on the health of persons working in the offices, but has led to a high incidence of soiling of equipment and machinery.

The conventional method of dealing with this problem in offices has been to install ventilation fans in places such as smoking-rooms where the contamination is obviously high, thus expelling the contaminated air from the room. However, this method suffers from the disadvantage that the temperature inside the room is affected by the temperature outside it, resulting in a considerable deterioration in the efficiency of heating and cooling. In order to maintain a constant temperature within the room while at the same time purifying the air, not only must the ventilation fan be operated continuously, but it is necessary also to operate the air-conditioner to heat or cool as required. This is undesirable because of the vast amounts of electricity which air-conditioners and ventilation fans consume.

It is in these circumstances that electronic air-cleaners employing electric dust-collection devices have come into their own as being capable of operating with minimal ventilation, thus eliminating the wastefulness of the air-conditioner and offering considerable savings in terms of the amount of electric power which they consume.

An example of a conventional air-cleaner of this sort is illustrated in FIGS. 19 and 20. It is designed to be hung on the wall, and consists in the main of a suction member 3, whereby the contaminated air 2 within a room is sucked in through the aperture 1, a pre-filter 4, an electric dust-collection unit 5, a deodorising filter 6 comprising activated carbon fibres, a dust-collection member 7 wherein dust and odours are eliminated from the air which passes through it, an expulsion member 9 fitted with louvres through which air 8 which has been purified in the dust-collection member 7 is expelled from the room, and a power supply member which is not shown in the drawing. The abovementioned expulsion member 9 is fitted with an electrically operated fan 10, whereby contaminated air 2 is sucked in through the aperture 1, and after being purified in the dust-collection member 7, is expelled as clean air 8 through the expulsion member 9. This air-cleaner is configured in such a manner that the suction member 3 protrudes along the surface of the ceiling, thus making it possible for the air within the room to circulate efficiently, as a result of which it is purified instantly. The front plate of the dust-collection member 7 comprises a door 11 which can be lowered in order to allow the pre-filter 4, electric dust-collection unit 5 and deodorising filter 6 to be removed, cleaned and re-inserted so that they can be used time and time again.

With reference to FIGS. 21–25 there now follows a detailed description of the electric dust-collection unit 5, which forms the most important part of the air-cleaner.

FIG. 21 is a longitudinal cross-section illustrating the structure of the electric dust-collection unit; FIG. 22 is a longitudinal cross-section showing the electric dust-collection unit separated into sub-units; FIG. 23 is an oblique view of the electric dust-collection seen from the front (the side from which the air is sucked in); FIG. 24 is an enlarged oblique view of part of FIG. 23; and FIG. 25 is an oblique view of the electric dust-collection seen from the rear (the side on which the air is expelled). As these drawings show, the abovementioned electric dust-collection unit consists of needle electrodes 12 shaped like gramophone needles, which form ionisation space areas, and deflecting electrodes 13 shaped like rectangular columns approximately 10 mm square and 5–6 cm in length, which support and hold the needle electrodes 12 firm and from the leading surface of which they protrude. The two together form composite needle and deflecting electrodes 14, which are arranged vertically and horizontally in the form of a lattice. The composite needle and deflecting electrodes 14 are arranged in such a manner that collector cells (electrodes which attract and collect dust and other particulates by means of static electricity) 15 in the shape of hollow rectangular tubes approximately 20 mm square and 5–6 cm in length are inserted between each of them so as to create a rectangular gap of approximately 5 mm around them, this acting as a passage for the air. As FIG. 22 shows, the male sub-unit 16 and the female sub-unit 17 can be separated in order to facilitate cleaning.

The male sub-unit 16 has a box-shaped frame (hereinafter referred to as the 'outer box frame') 18, to the lower surface of which are joined by way of insulating plates 20 supporting members 19, which support a large number of composite needle and deflecting electrodes 14 and are linked to one another so as to be equipotential, the large number of composite needle and deflecting electrodes 14 being arranged in lattice shape on the inside of the outer box frame 18. The female sub-unit 17 also has a box-shaped frame (hereinafter referred to as the 'inner box frame') 21, on the inside of which are formed in a lattice shape a large number of the collector cells 15. When the device is in operation, a high voltage (5–6 kV) is impressed from a high-voltage direct-current power source not shown in the drawings so that the composite needle and deflecting electrodes 14 and the collector cells 15 are connected in such a manner that the former has positive and the latter negative potential. As FIGS. 23 and 24 show, the outer box frame 18 of the male sub-frame 16 and the inner box frame 21 of the female sub-frame 17 fit into one another so that each of the composite needle and deflecting electrodes 14 corresponds in arrangement to one of the collector cells 15, which is to say, so that each composite needle and deflecting electrode 14 is inserted into a collector cell 15 without coming into contact with it.

FIG. 26 illustrates the action of the air-cleaner.

As will be seen from FIG. 26, when in the abovementioned configuration a high direct-current voltage is applied to the composite needle and deflecting electrodes 14, a sort of corona discharge occurs around the tip of the needle electrodes 12. The discharge is sustained and stable, and leads to the formation of an ionisation space area 22. When the contaminated air 2 sucked into the suction member 3 by means of the electrically operated fan 10 now passes through the ionisation space area 22, the oxygen, being low in ionisation energy, undergoes electrolytic dissociation into positive ions. These adhere to particulates 23 in cigarette smoke and other contaminants, which themselves receive the electric charge of the positive ions. When the charged particulates 23 then pass through between the deflecting electrode 13 and the collector cell 15, those which are close to the collector cell 15, which has a negative potential, adhere to it. Meanwhile, those particulates 23 which are at a distance from the collector cell 15 are repelled by the positive potential of the polar plate of the deflecting electrode 13 in the direction of the collector cell 15, to which they adhere. In this manner, it is possible to implement effective dust collection from small particulates of approximately 0.01 $\mu$m in diameter to relatively large ones of around 10 $\mu$m.

As is shown in FIG. 27 (a), the needle electrodes 12 consist of a pin member 120 of stainless steel or a similar material with a nickel-plated tip. Meanwhile, the deflecting electrodes 13 consist of pairs of plate electrode members 130 of stainless steel or a similar material, which are folded into the shape of a valley with a flat bottom and sides at right-angles to it. These are placed together, with their open sides facing each other and their corresponding ends matching, so as to form a rectangular pillar shape. Hitherto, as FIG. 27 (b) demonstrates, it has been common practice when producing the composite needle and deflecting electrodes 14 and after placing a pair of folded plate electrode members 130 on top of each other to form a rectangular pillar, to fit the base of the pin member 120 against the joint on their leading edge, and secure the vicinity of the point of contact between the pin member 120 and the two folded plate electrode members 130 with silver solder 24, thus fashioning the deflecting electrode 13 and integrating it with the pin electrode 12 at the same time. However, it is normal to find some 100 composite needle and deflecting electrodes mounted on one electric dust-collection unit 5, for which reason the conventional method of production using silver solder 24 requires a great deal of work and time to be expended on it. Consequently, there has been a problem of cost-effectiveness in that while air-cleaners of the needle discharge type present the technical advantage of more powerful dust collection, there has been no way of reducing costs and rendering mass-production feasible.

On the other hand, the simpler configuration of lattice-shaped collector cells 15 illustrated in FIG. 28, wherein a set of metal plates 150 (hereinafter referred to as 'cell electrode plates') of stainless steel or a similar material having numerous equidistant slit-shaped notches 25 (hereinafter referred to as 'notch slits') are successively interlocked at the notch slits 25 from above and below at right-angles, facilitates mass-production, but is fraught with the problem that since the cell electrode plates 150 are thin, they are liable to become deformed as a result of accidental external forces acting on them during manufacture or transport, effective dust collection being reduced considerably where such deformation (indicated on the drawing by the symbol A) occurs.

SUMMARY OF THE INVENTION

With the foregoing in view, it is an object of the present invention to provide an electric dust-collection unit which is not only cheaper and capable of being mass-produced, but has excellent properties of resistance to mechanical and thermal shocks and further to provide a method of manufacturing same, together with an air-cleaner, electric dust-collection device and exhaust smoke removal device employing that unit.

With the object of solving the abovementioned problem, according to a first aspect of the present invention there is provided an electric dust-collection unit comprising needle electrodes for the purpose of charging particulates within the air by causing corona discharges around their tips, collector electrodes arranged in tubular shape corresponding to the needle electrodes for the purpose of attracting and collecting the charged particulates by means of static electricity, and deflecting electrodes which are arranged in such a way as to be inserted within the collector electrodes for the purpose of imparting a deflecting force on the charged particles in the direction of the collector electrodes, each of the deflecting electrodes being configured in the form of a hollow column comprising a forward plate section having a mounting hole for the purpose of fitting and retaining the needle electrode, and side plate section facing the collector electrode at a prescribed distance, and each of the needle electrodes being fixed on to the forward plate section of one of the deflecting electrodes in such a way that its tip protrudes from the surface of the forward plate sections, while its body is inserted firmly in the mounting hole.

In the foregoing, as a method of manufacturing the electric dust-collection unit, the preferable mode is one wherein a mounting hole having a diameter smaller than that of the body of the needle electrode is created in advance in the forward plate section of the deflecting electrode, after which in fitting and retaining the needle electrode on to the forward plate section of the deflecting electrode, the tip of the needle electrode is caused to protrude from the surface of the forward plate section by driving the needle electrode into the mounting hole in the forward plate section from the hollow inside of the deflecting electrode, while it is fixed by inserting the body of the needle electrode firmly into the mounting hole.

Moreover, according to a second aspect of the present invention there is provided an electric dust-collection unit comprising needle electrodes for the purpose of charging particulates within the air by causing corona discharges around their tips, collector electrodes arranged in tubular shape corresponding to the needle electrodes for the purpose of attracting and collecting the charged particulates by mean s of static electricity, and de flecting electrodes which are arranged in such a way as to be inserted within the collector electrodes for the purpose of imparting a deflecting force on the charged particles in the direction of the collector electrodes, wherein in each of the deflecting electrodes a first folded plate electrode member comprising a first forward plate section having a first mounting hole for the purpose of fitting and retaining the needle electrode and first side plate section facing the collector electrode at a prescribed distance, and a second folded plate electrode member comprising a second forward plate section having a second mounting hole for the purpose of fitting and retaining the needle electrode and second side plate section facing the collector electrode at a prescribed distance are assembled in the form of a hollow rectangular column, the first and second forward plate sections being caused to overlap in such a way that the first and second mounting holes share more or less the same axis, while each of the needle electrodes is fixed on to the first and second forward plate sections of one of the deflecting electrodes in such a way that its tip protrudes from the surface of the first and second forward plate sections, while its body is inserted firmly in the first and second mounting holes.

In the foregoing, the preferable mode is one wherein the first and second side plate sections are each folded and processed in such a way that their cross-sections are shaped like a valley with a flat bottom and sides at right-angles to it, the deflecting electrodes configured in the shape of a hollow rectangular column being formed by assembling these two side plate sections so as to face each other.

Moreover, in the foregoing, as a method of manufacturing the electric dust-collection unit, the preferable mode is one wherein the first and second mounting holes having a diameter smaller than that of the body of the needle electrode are created in advance in the first and second forward plate sections of the deflecting electrode, and that in fitting and retaining the needle electrode on to the deflecting electrode, the deflecting electrode is first formed by assembling the first and second folded plate electrode members in the form of a hollow rectangular column and causing the first and second forward plate sections to overlap in such a way that the first and second mounting holes share more or less the same axis, after which the tip of the needle electrode is caused to protrude from the surface of the first and second forward plate sections by driving the needle electrode into the mounting hole in the first and second forward plate sections from the hollow inside of the deflecting electrode, while it is fixed by inserting the body of the needle electrode firmly into the first and second mounting holes.

Furthermore, according to a third aspect of the present invention there is provided an electric dust-collection unit comprising a plurality of needle electrodes for the purpose of charging particulates within the air by causing corona discharges around their tips, a plurality of collector electrodes arranged in tubular shape corresponding to the needle electrodes for the purpose of attracting and collecting the charged particulates by means of static electricity, and a plurality of deflecting electrodes which are arranged in such a way as to be inserted within the collector electrodes for the purpose of imparting a deflecting force on the charged particles in the direction of the collector electrodes, wherein the plurality of collector electrodes is arranged as a whole in a rectangular lattice shape by causing pluralities of first and second flat plate electrode members each having a plurality of notch slits at equal distances from one another to interlock at the notch slits in such a way as to intersect with one another at right-angles, while each notch slit comprises a narrow slit section which is the site of the interlocking, and a notch guide section which acts as a guide into the slit section, there being formed at least on the edge between one end and the other of the slit section one or more thorns which cause the slit at that point to be narrower than the thickness of the flat plate electrode member.

In the foregoing, it is preferable that the narrowest points where the thorns are present in the slit sections are approximately 3–20 $\mu$m narrower than the thickness of the flat plate electrode members.

Moreover, in the foregoing, as a method of manufacturing the electric dust-collection unit, the preferable mode is one wherein in forming the collection electrode, pluralities of the first and second flat plate electrode members are placed with the notch guide sections facing one another where the notch slits correspond, and are caused to interlock at an angle of intersection of 100–175 degrees in such a way that they are assembled as a whole in an oblique lattice shape, and then adjusted into a rectangle to form a large number of collector electrodes arranged in a rectangular lattice shape.

Furthermore, in the above first, second and third aspects, the preferable mode is one wherein the electric dust-collection unit comprises a female (concave) sub-unit having a large number of the collector electrodes arranged in a lattice shape, and a male (convex) sub-unit having a large number of needle and deflecting electrodes arranged in a one-to-one correspondence with the collector electrodes, the female (concave) and male (convex) sub-units being fitted together in such a way that they are capable of being attached and detached at will. The abovementioned electric dust-collection unit to which the first, second and third aspects pertain is suitable for mounting in air-cleaners fitted in smoking-rooms, offices and similar locations, electric dust-collection devices fitted in factories and other places where the air is filled with oil-mist, devices for removing exhaust smoke fitted in the exhaust passages of diesel engines and elsewhere.

The first, second and third aspects of this invention make it possible to combine the needle electrode and the deflecting electrode with the use of impact alone, and without relying on welding, a fact which makes the operation both simple and quick. This in turn makes it possible to reduce costs, and facilitates mass-production and improved resistance to mechanical and thermal shocks. Moreover, the fact that numerous thorns are provided in the slit sections of the collector cells means that it is more difficult for them to become distorted because the retention effect of these thorns comes into play. It should be added that the presence of numerous thorns is no impediment to simplicity and does not hinder mass-production provided that the method of manufacture outlined in this example is followed.

BRIEF DESCRIPTION OF THE DRAWINGS

FIGS. 27A and 27B are oblique views which demonstrate typically the conventional method of manufacture of composite needle and deflecting electrodes.

DETAILED DESCRIPTION OF THE PREFERRED EMBODIMENTS

There follows a description of the preferred embodiment of the present invention with reference to the drawings.

Figure 1:
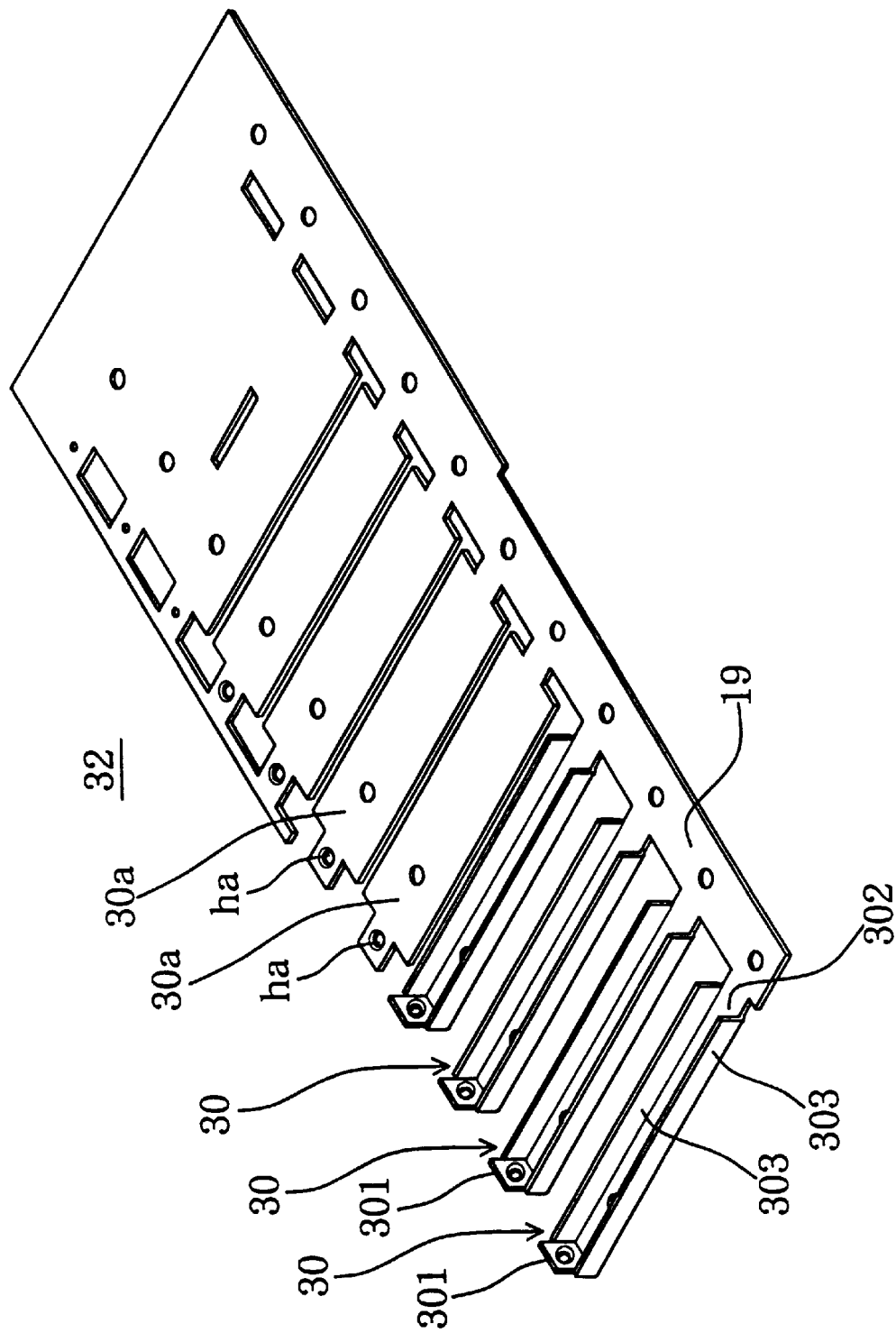
FIG. 1 serves to elucidate the method of manufacture of the composite needle and deflecting electrodes which are incorporated into the electric dust-collection unit (male sub-unit) for an air-cleaner which forms an embodiment of the present invention: more specifically, it is an oblique view which shows step by step how one of a pair of folded plate electrode members which constitutes a deflecting electrode is produced.
Figure 2:
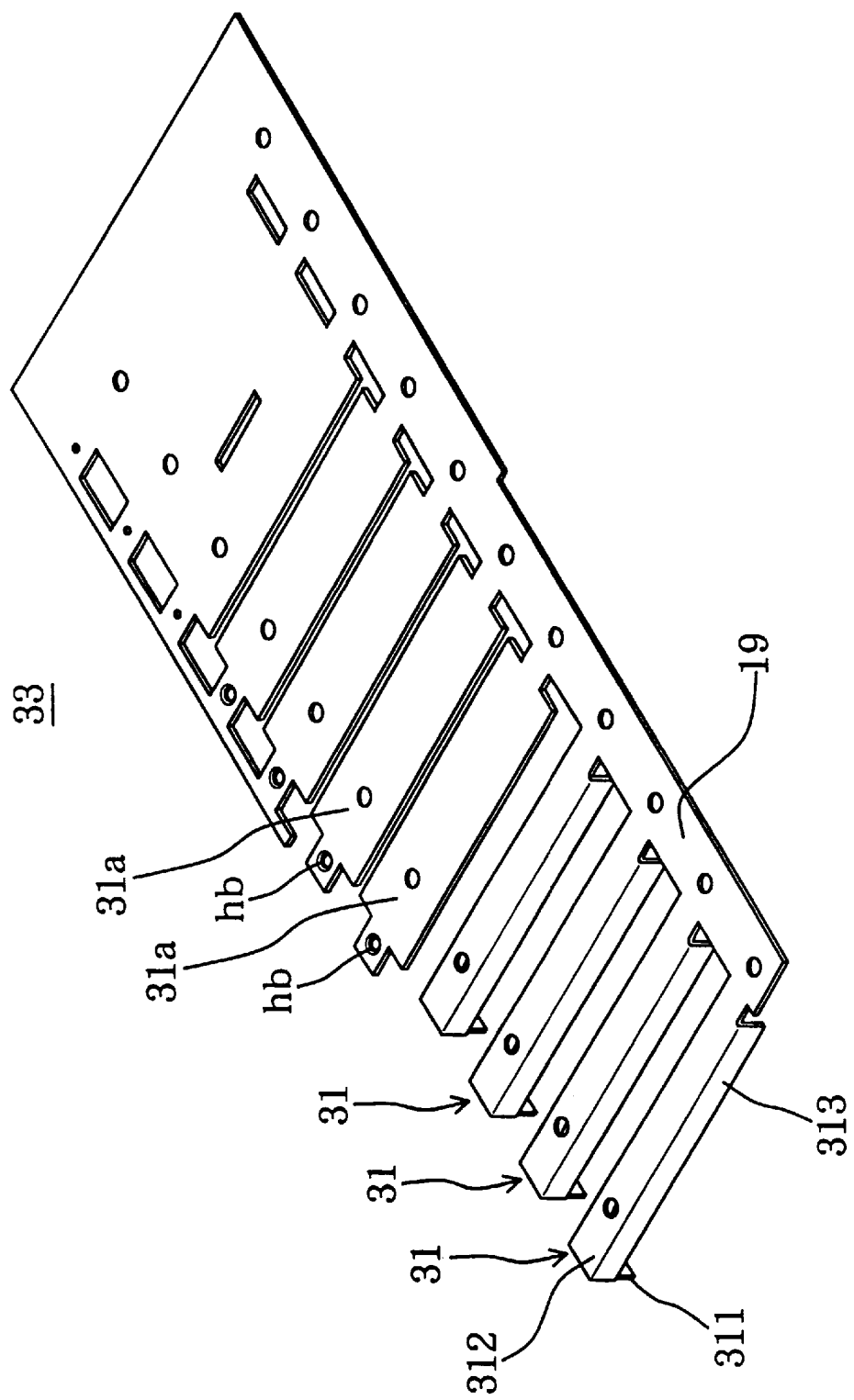
FIG. 2 is an oblique view which shows step by step how the other member of the pair of folded plate electrode members which constitutes a deflecting electrode is produced.
Figure 3:
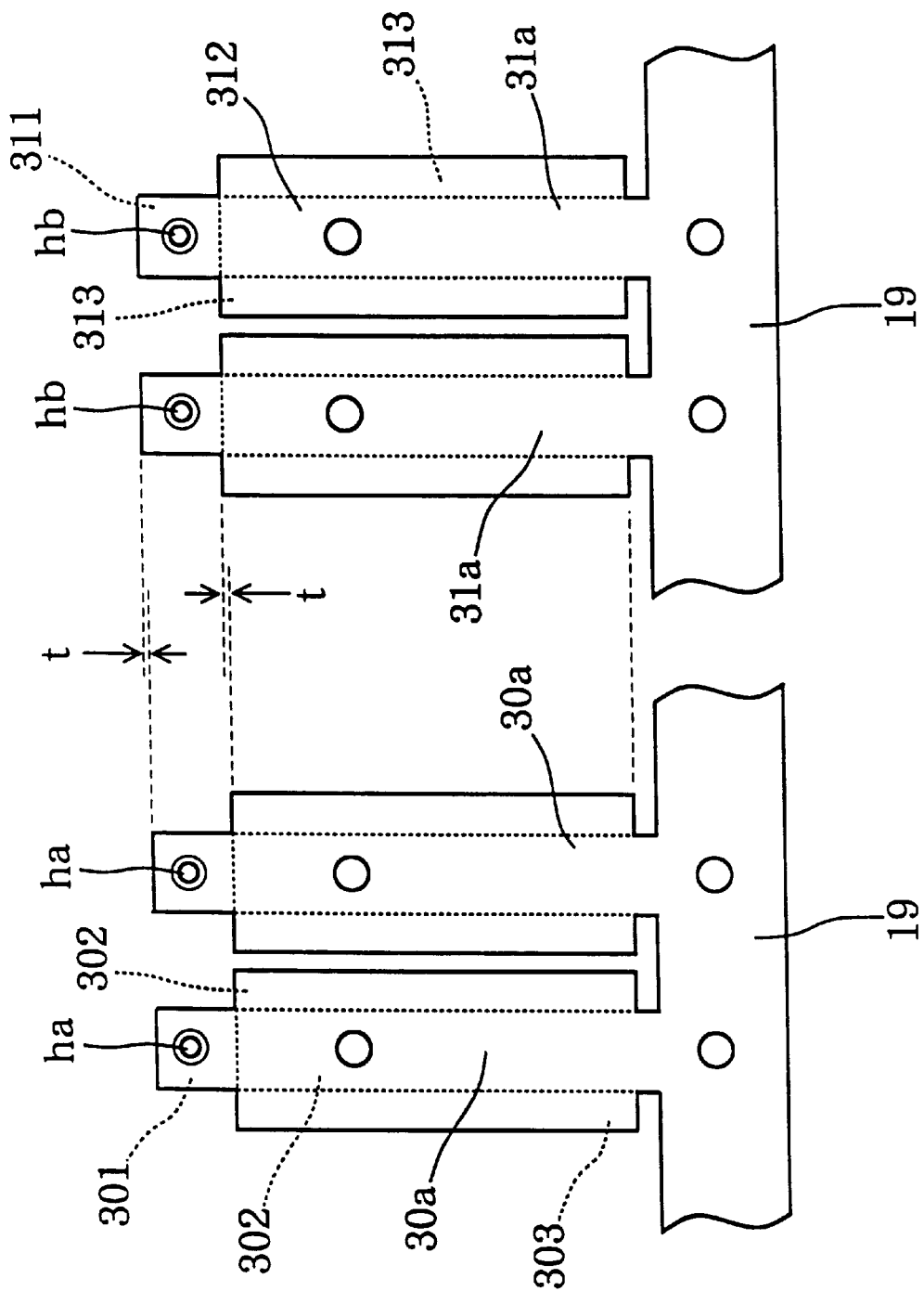
FIG. 3 is an enlarged drawing of part of FIGS. 1 and 2.
Figure 4:
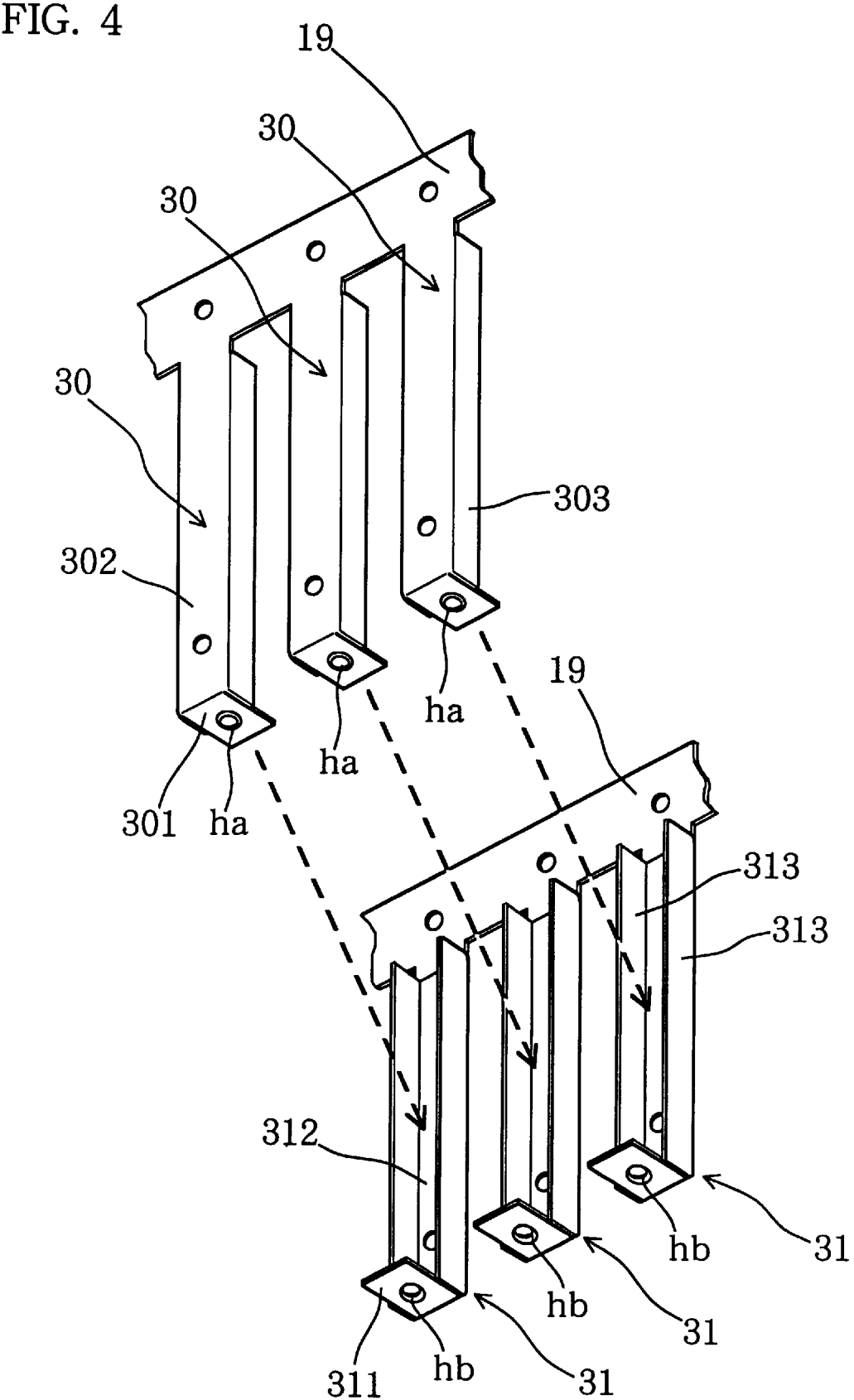
FIG. 4 is an oblique view which demonstrates typically how a pair of folded plate electrode members is combined to form a deflecting electrode.
Figure 5A:
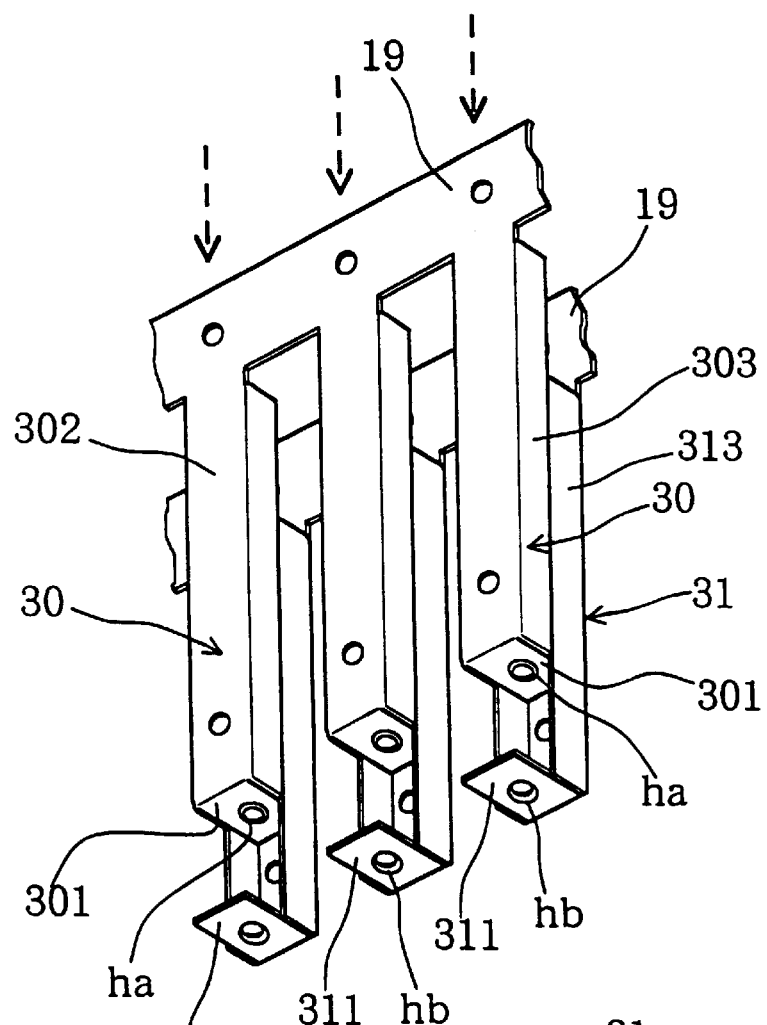
FIG. 5 also demonstrates typically how a deflecting electrode is formed, 5A being an oblique view, and 5B a partial cross-section.
Figure 5B:
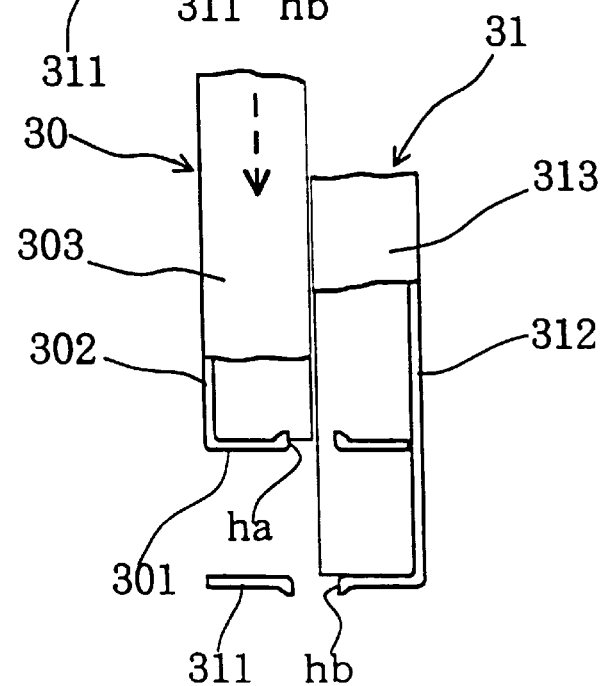
Figure 6A:
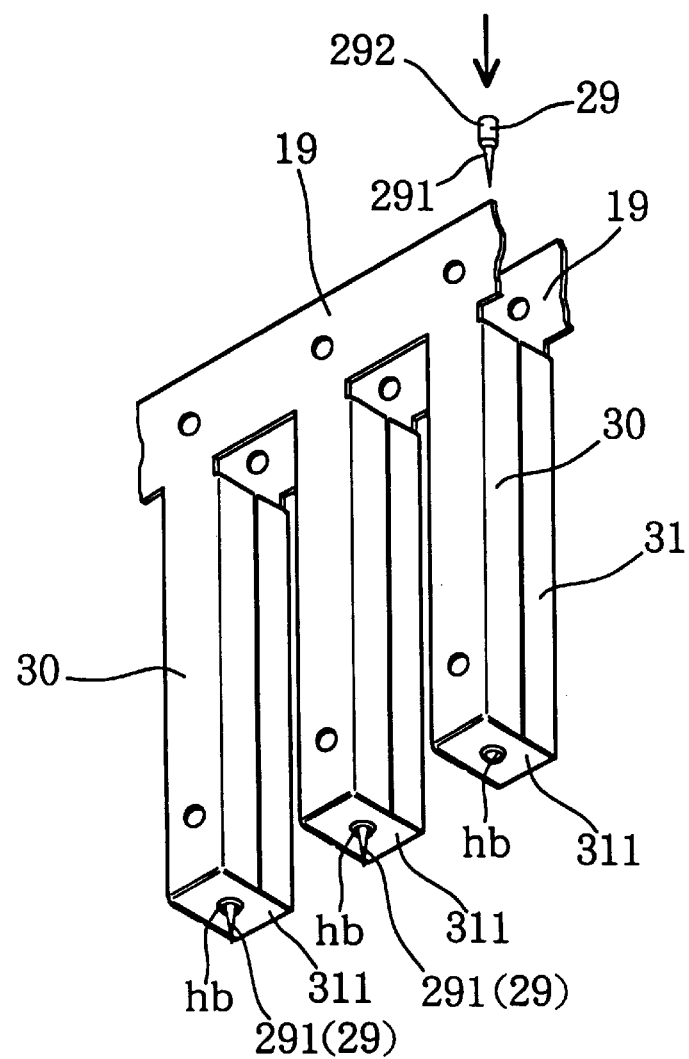
FIG. 6 demonstrates typically how a pin member is driven into a deflecting electrode in order to form a composite needle and deflecting electrode, 6A being an oblique view, and 6B a partial cross-section.
Figure 6B:
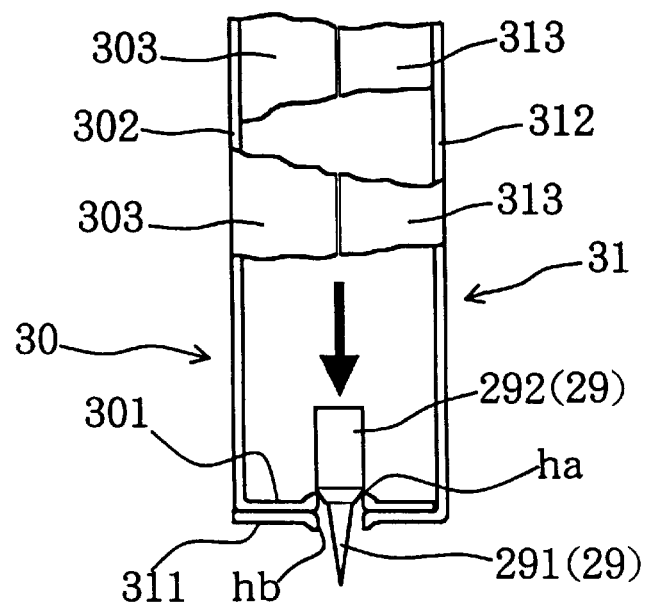
Figure 7A:
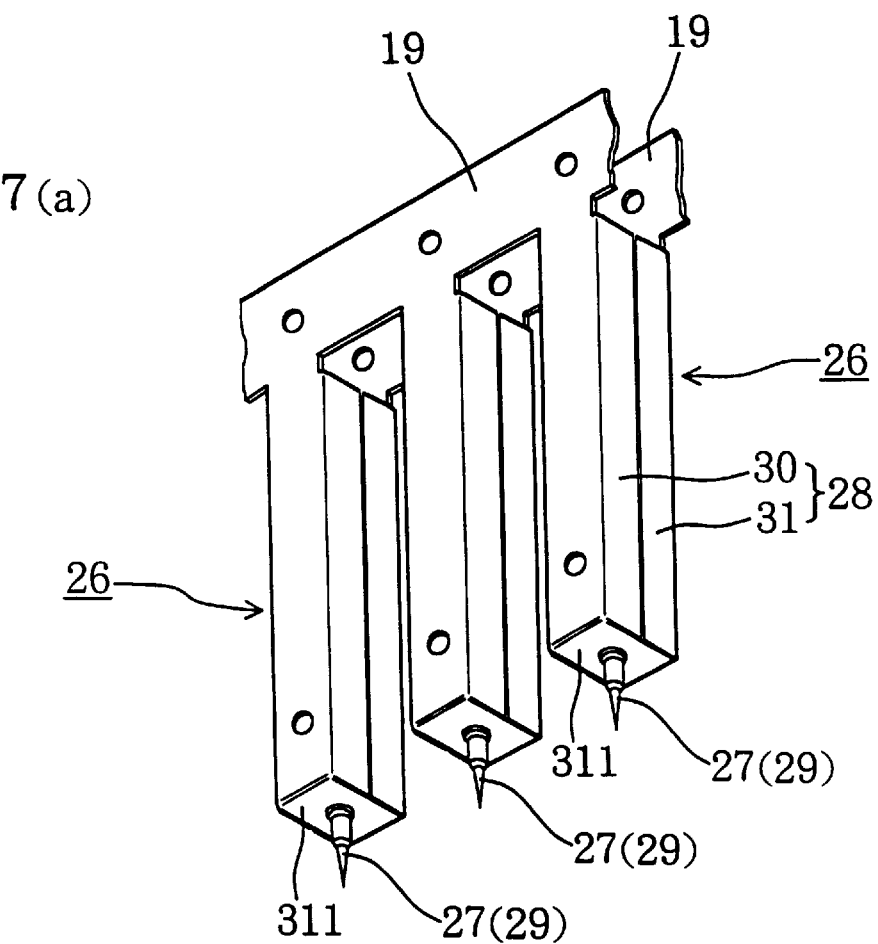
FIG. 7 illustrates the structure of a completed composite needle and deflecting electrode, 7A being an oblique view, and 7B a partial cross-section.
Figure 7B:
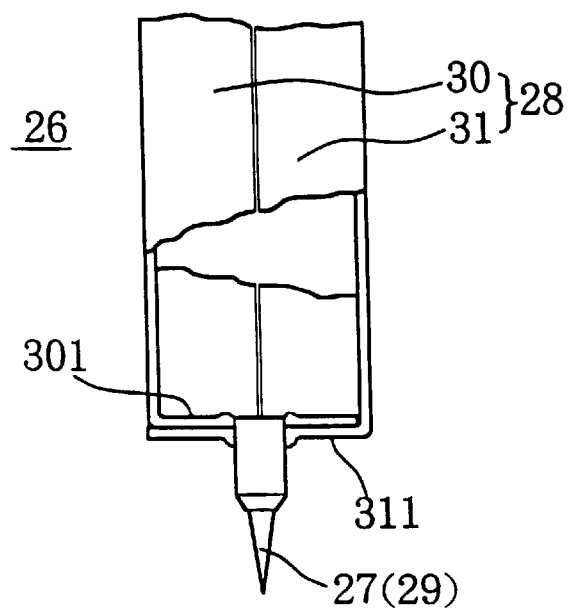

FIGS. 1–7 serve to elucidate the method of manufacture of the composite needle and deflecting electrodes which are incorporated into the electric dust-collection unit (male sub-unit) for an air-cleaner which forms an embodiment of the present invention. More specifically, FIG. 1 is an oblique view which shows step by step how one of a pair of folded plate electrode members which constitutes a deflecting electrode is produced; FIG. 2 is an oblique view which shows step by step how the other member of the pair of folded plate electrode members which constitutes a deflecting electrode is produced; FIG. 3 is an enlarged drawing of part of FIGS. 1 and 2; FIG. 4 is an oblique view which demonstrates typically how a pair of folded plate electrode members is combined to form a deflecting electrode; FIG. 5 also demonstrates typically how a deflecting electrode is formed, (a) being an oblique view, and (b) a partial cross-section; FIG. 6 demonstrates typically how a pin member is driven into a deflecting electrode in order to form a composite needle and deflecting electrode, (a) being an oblique view, and (b) a partial cross-section; and FIG. 7 illustrates the structure of a completed composite needle and deflecting electrode, (a) being an oblique view, and (b) a partial cross-section.

Figure 8:
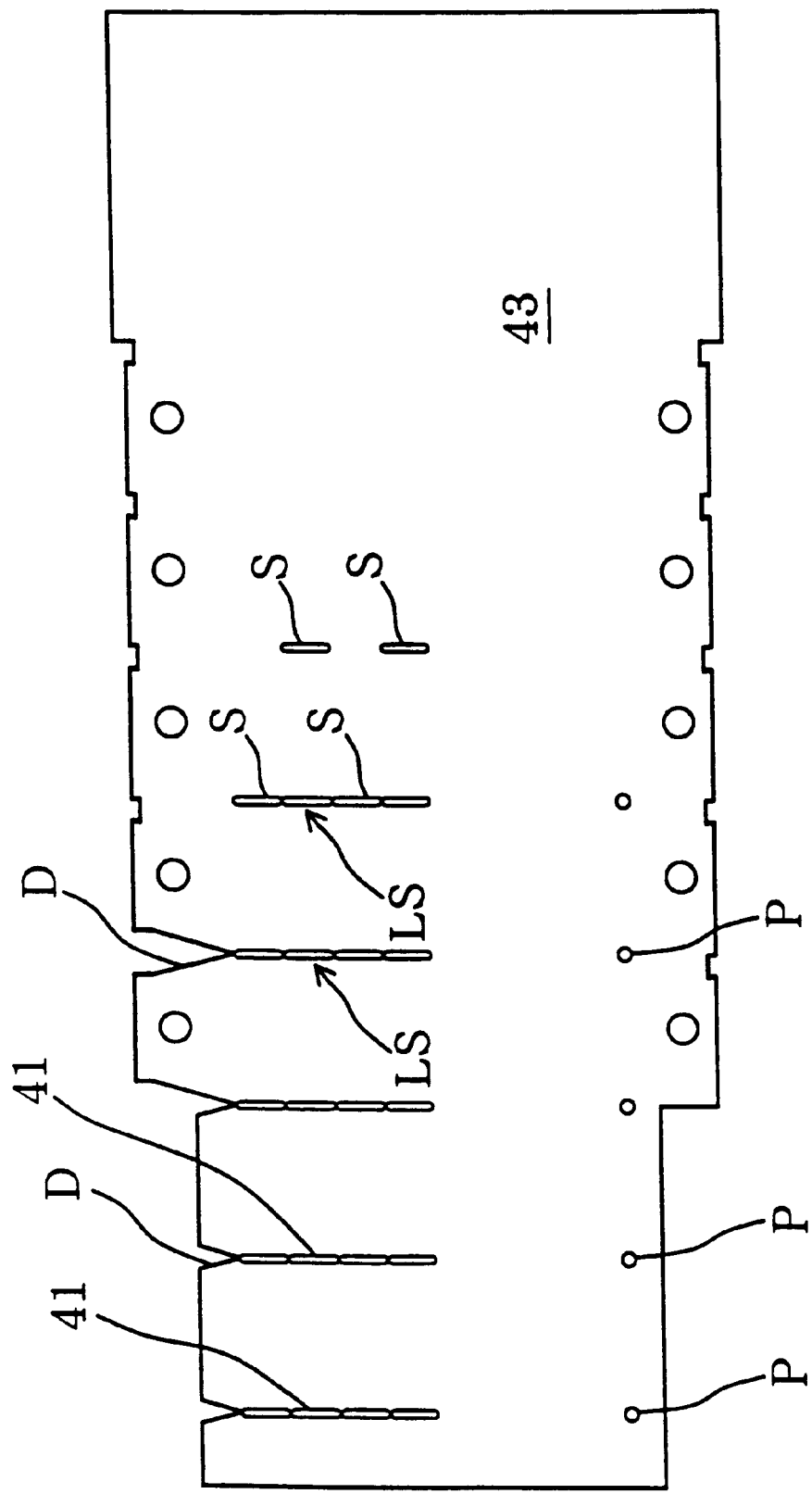
FIG. 8 serves to elucidate the method of manufacture of the collector cells which are incorporated into the electric dust-collection unit (female sub-unit) for the air-cleaner which forms an embodiment of the present invention: more specifically, it is a top view which shows step by step how a cell electrode plate is produced.
Figure 9:
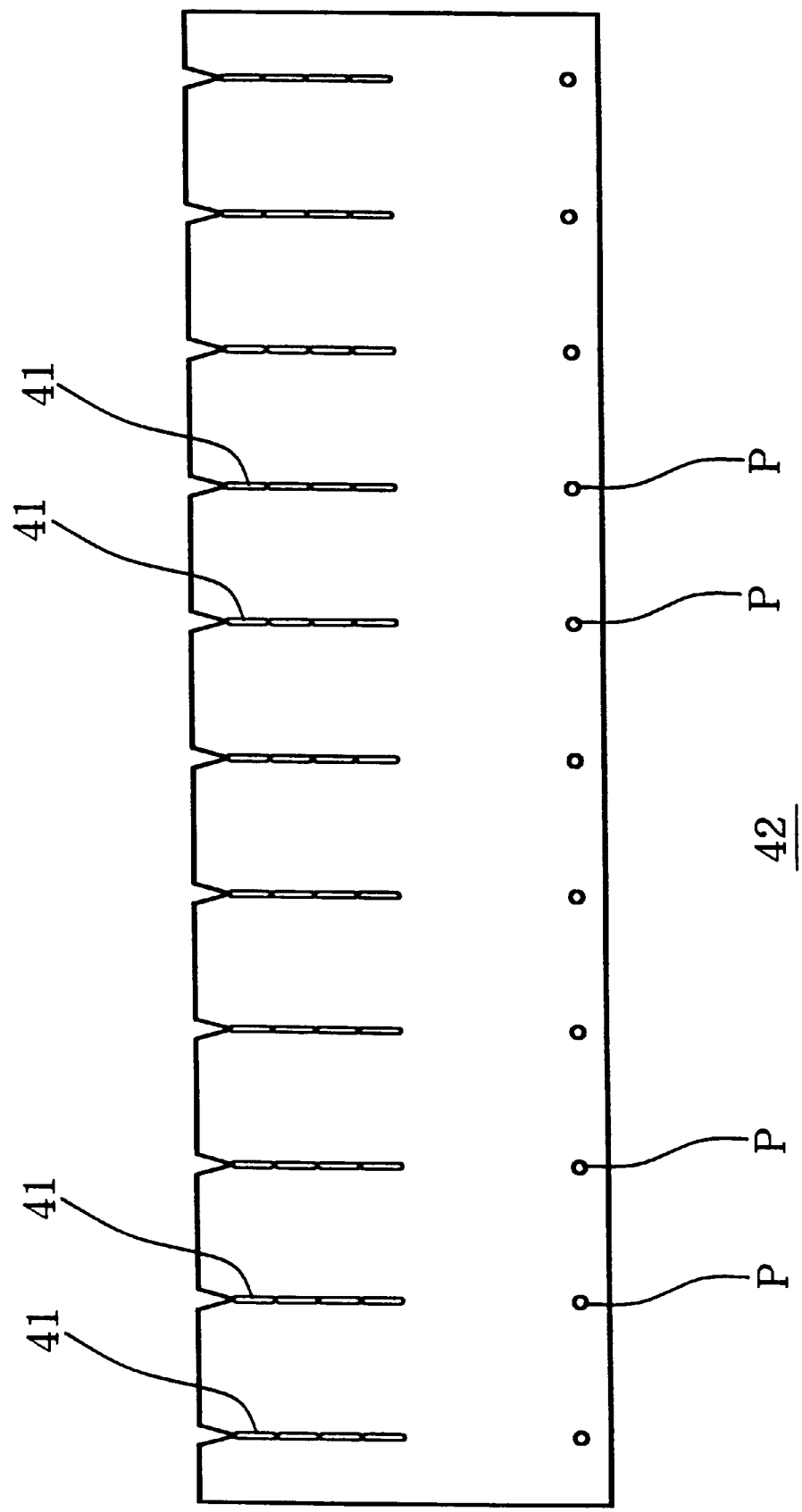
FIG. 9 is a top view which illustrates the shape of a completed cell electrode plate.
Figure 10:
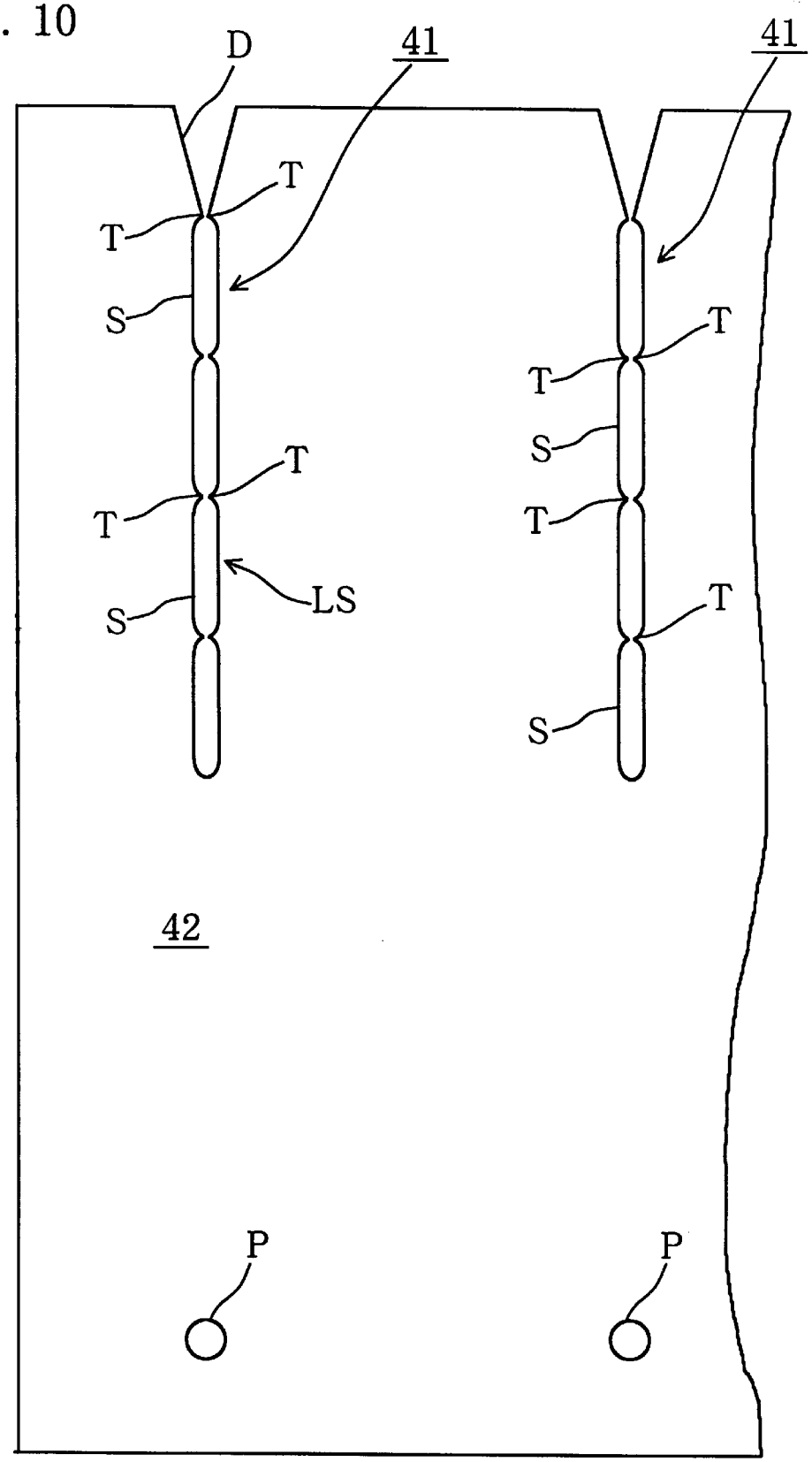
FIG. 10 is an enlarged drawing of part of FIG. 9.
Figure 11A:
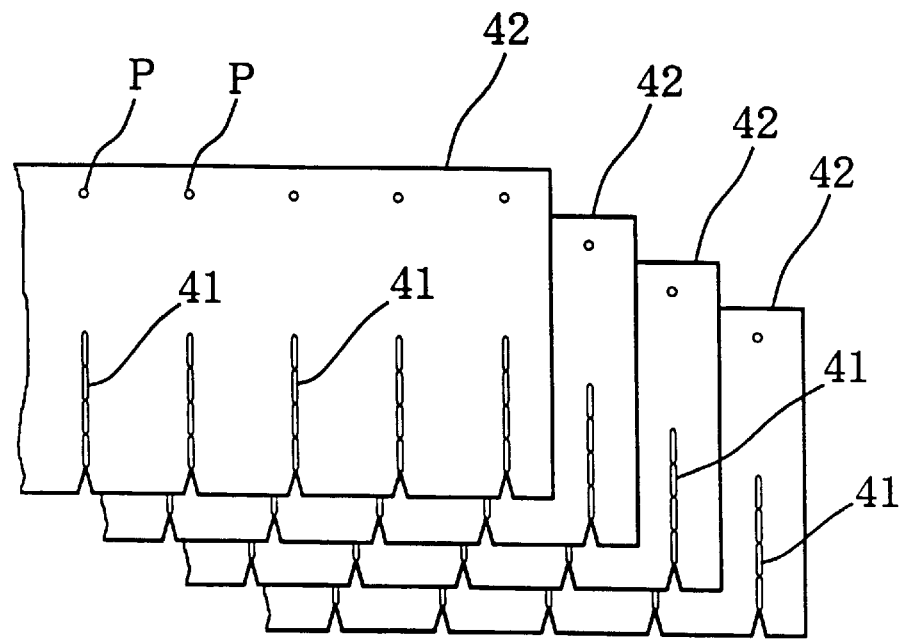
FIGS. 11A and 11B demonstrate typically how a set of cell electrode plates is combined to form collector cells.
Figure 11B:
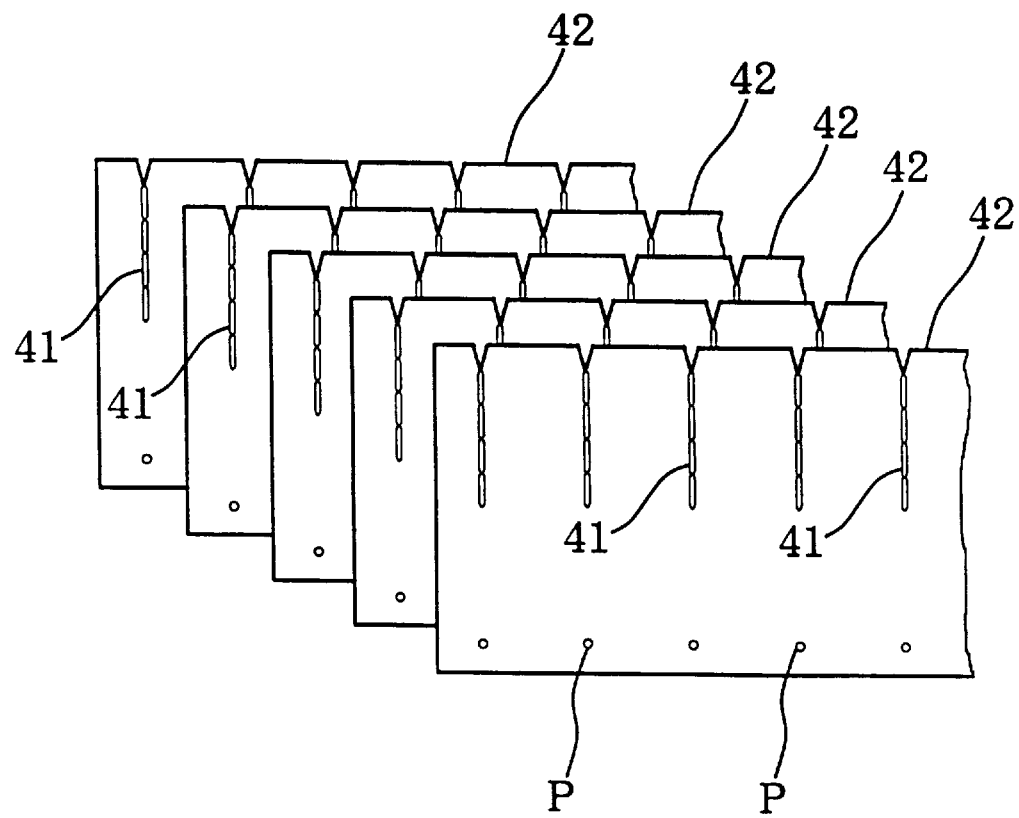
Figure 12:
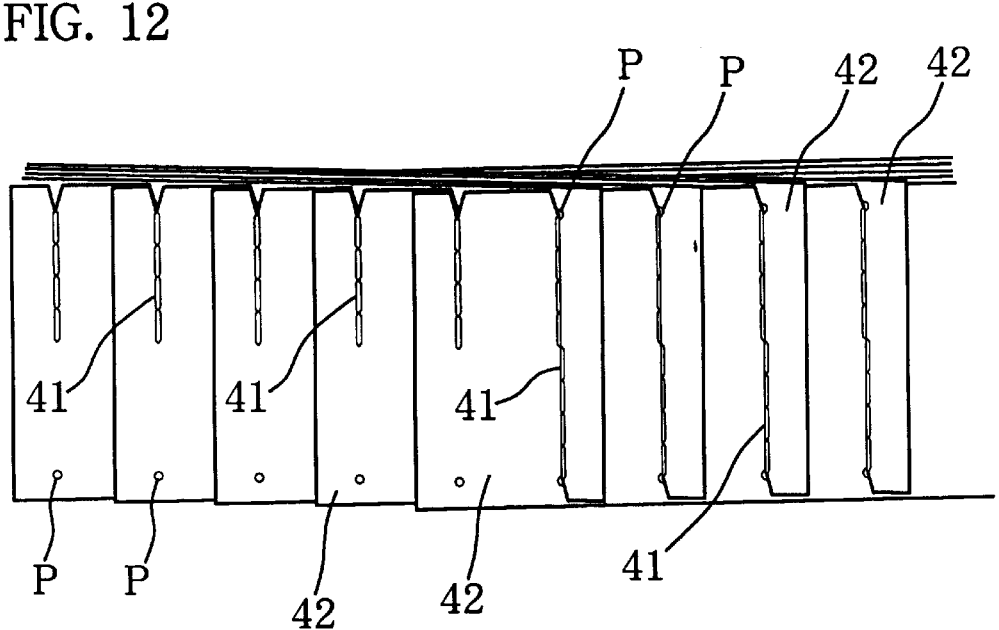
FIG. 12 also demonstrates typically how collector cells are formed.
Figure 13:
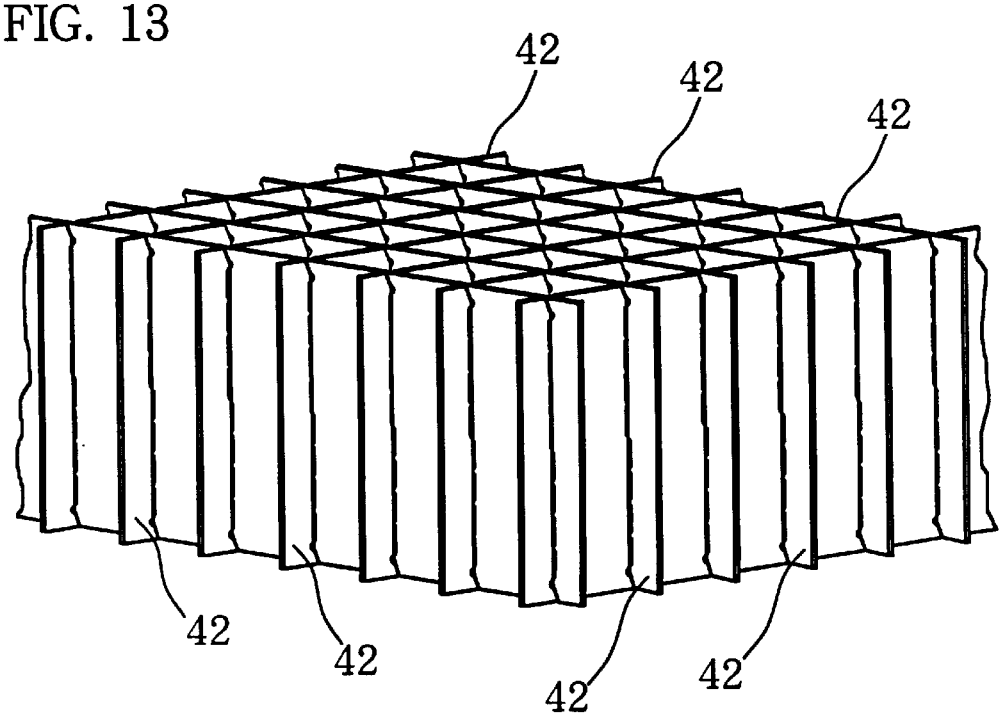
FIG. 13 also demonstrates typically how collector cells are formed.
Figure 14:
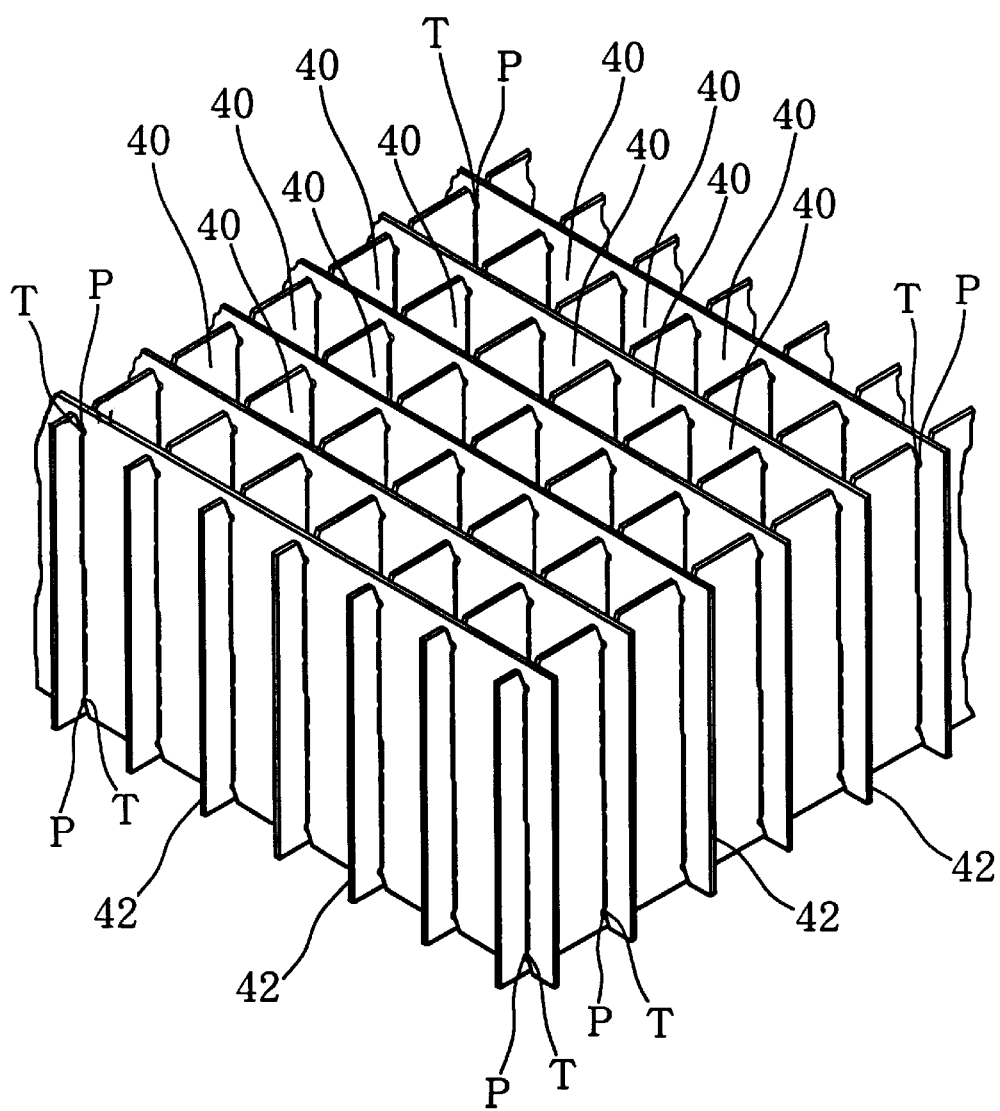
FIG. 14 is an oblique view which illustrates the external appearance and structure of completed collector cells.
Figure 15:
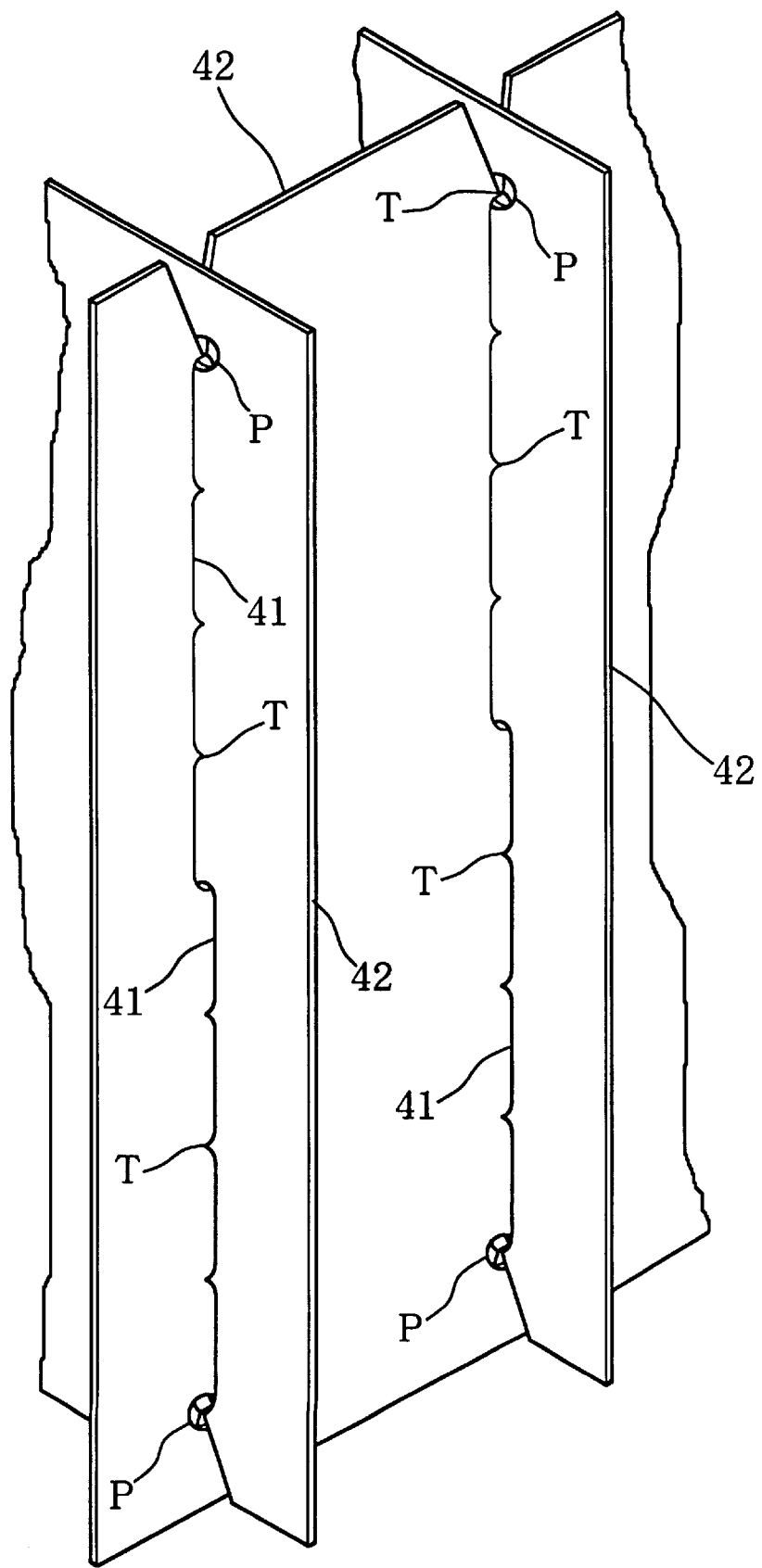
FIG. 15 is an enlarged oblique view of part of FIG. 14.

Meanwhile, FIGS. 8–15 serve to elucidate the method of manufacture of the collector cells which are incorporated into the electric dust-collection unit (female sub-unit) for the air-cleaner which forms an embodiment of the present invention. More specifically, FIG. 8 is a top view which shows step by step how a cell electrode plate is produced; FIG. 9 is a top view which illustrates the shape of a completed cell electrode plate; FIG. 10 is an enlarged drawing of part of FIG. 9; FIG. 11 demonstrates typically how a set of cell electrode plates is combined to form collector cells; FIG. 12 also demonstrates typically how collector cells are formed; FIG. 13 also demonstrates typically how collector cells are formed; FIG. 14 is an oblique view which illustrates the external appearance and structure of completed collector cells; and FIG. 15 is an enlarged oblique view of part of FIG. 14.

There are two points in which this air-cleaner differs greatly from conventional air-cleaners of the needle discharge type. The first is that it adopts a method of attaching the needle electrode to the deflecting electrode by driving a pin member into a pair of folded plate electrode members instead of welding them as hitherto. The second is that it provides tiny thorns in the notch slits of the cell electrode plates as a means of preventing the collector cells from becoming deformed. Apart from these two points, its mechanism and the principle by which it works are more or less identical with those of the prior art which have already been described. Consequently, this embodiment will either omit or simplify the description of those parts which are similar in structure to conventional ones, and concentrate on explaining the structure of the composite needle and deflecting electrodes and of the collector cells, both of which differ from the prior art. In particular, it will concentrate on the method of their manufacture.

There follows firstly a description of the composite needle and deflecting electrode and the method of its manufacture.

As FIG. 7 shows, this composite needle and deflecting electrode 26 is the same as hitherto in that it is composed of a needle electrode 27 and a deflecting electrode 28, which are combined into a single structure. The needle electrode 27 consists of a pin member 29 of stainless steel or a similar material and having a nickel-plated tip. The deflecting electrode 28 consists of a pair of folded plate electrode members 30, 31 of stainless steel or a similar material. As the drawing also shows, the forward plate section 301 of one of the folded plate electrode members 30 and the forward plate section 311 of the other folded plate electrode member 31 fit over each other to form the deflecting electrode 28, while each of the forward plate sections 301, 311 has a mounting hole ha, hb for affixing the pin member 29, the mounting holes sharing the same axis. A point wherein the present invention differs greatly from the prior art is the fact that a composite electrode body consisting of the deflecting electrode 28 and the needle electrode 27 is formed by inserting and fixing the common pin member 29 into both these mounting holes ha, hb.

As is illustrated in FIGS. 1 and 2, the folded plate electrode members 30, 31 are moulded and processed by arranging in a line a plurality of punching tools (not shown in the drawing), each of which consists of a punch and a die. Metal plates 32, 33 of, for instance, 0.5 mm-thick stainless steel are fed one after another to these punching tools and punched into various shapes. The flat members 30a, 31a which are obtained as a result of a combination of piercing, contour punching and notching are then subjected to bending in order to produce three-dimensional folded shapes, thus yielding a plurality of folded plate electrode members 30 (31) which are arranged in a horizontal row along the length of a connecting supporting member 19, being connected to one another thereby.

As a result of the abovementioned process each of the folded plate electrode members 30, 31 is formed into the shape of a valley with a flat bottom and sides at right-angles to it, whereof the bottom section or web 302, 312 between the two sides or flanges 303, 313 is 5–6 cm in length. The forward edge is also folded at right-angles to yield a forward plate section 301, 311. The width of the flanges 303, 313 is roughly half that of the web 302, 312, which is for instance about 10 mm. Thus the deflecting electrode 28 is formed by matching the edges of the corresponding flanges 303, 313 of one folded plate electrode member 30 and another folded plate electrode member 31. It should be added that since during the process of forming the deflecting electrode 28 the forward plate sections 301, 311 are laid on top of each other in such a way that the forward plate section 301 of one folded plate electrode member 30 comes inside, while the forward plate section 311 of the other folded plate electrode member 31 goes outside, the length of the one folded plate electrode member 30 is made shorter than that of the other folded plate electrode member by the thickness of the plate t (for instance 5 mm).

In compliance with this, each side of forward plate sections 301, 311 is made roughly twice the dimension of the width of flanges 303, 313 (for instance about 10 mm). As has already been explained, mounting holes ha, hb of, for instance, about 1–3 mm in diameter for affixing the pin member 29 are opened in the centre of the forward plate sections 301, 311. Here it necessary for the diameter of the mounting holes ha, hb to be greater than that of the tip 291 of the pin member 29 but somewhat smaller than that of the body section 292. Moreover, as FIGS. 5 and 6 show, the mounting hole ha in the forward plate section 301 of the one folded plate electrode member 30 is sunk inwards, while the mounting hole hb in the forward plate section 311 of the other folded plate electrode member 31 is sunk outwards.

The composite needle and deflecting electrode 26 using these folded plate electrode members 30, 31. In doing so, first of all, as is shown in FIG. 4, one folded plate electrode member 30 is brought into contact with another folded plate electrode member 31 in such a way that the open sides of the valleys face each other. Next, as FIG. 5 demonstrates, the corresponding edges of the flanges 303, 313 are matched with each other, and the forward plate section 301 of the one folded plate electrode member 30 is placed inside, while the forward plate section 311 of the other folded plate electrode member 31 is placed outside. Then the two forward plate sections 301, 311 are brought on top of each other with the axes of the mounting holes ha, hb matching, as FIG. 6 shows, thus forming the deflecting electrode 28.

The next step is to insert the pin member 29 through the overlapping mounting holes ha, hb from the inside of the deflecting electrode 28, so that the tip 291 protrudes from the surface of the forward plate member 311. As has already been mentioned, the diameter of the mounting holes ha, hb is greater than that of the tip 291 of the pin member 29 but somewhat smaller than that of the body section 292. Consequently, the body section 292 is halted by the mounting holes ha, hb and remains inside the deflecting electrode 28. Next, an air hammer or similar impacting device which is not shown in the drawings is used to drive the thicker body section 292 of the pin member 29 from behind into the mounting holes ha, hb. The mounting holes ha, hb undergo elastic deformation as a result of the introduction of the body section 292, and the restitutive force and high degree of frictional force which are generated as a result fix the body section 292 of the pin member 29 firmly in the mounting holes ha, hb. Meanwhile, the one folded plate electrode member 30 and the other folded plate electrode member 31 are also linked firmly by means of the pin member 29, thus completing the deflecting electrode 28.

In this way the method of forming a composite needle and deflecting electrode outlined above makes it possible to combine the needle electrode 27 and the deflecting electrode 28 with the use of impact alone, and without relying on welding, a fact which makes the operation both simple and quick.

There follows a description of the collector cells and the method whereby they are produced.

As may be seen from FIG. 9, the collector cells 40 are formed by dividing a prescribed number of cell electrode plates 42 provided with numerous equidistant notch slits 41 into two groups G1, G2, and interlocking at the notch slits 41 a plurality of cell electrode plates 42 of the vertically aligned group G1 with a plurality of cell electrode plates 42 of the horizontally aligned group G2. The fact that the collector cells 40 are configured in the shape of a lattice is the same as in the prior art. What is different, as FIG. 10 shows, is the provision of a plurality of tiny thorns T on the edges of each notch slit 41. Moreover, as a result of the provision of these thorns T, as explained below, the method of interlocking the cell electrode plates 42 differs from the conventional one.

The cell electrode plates 42 are moulded and processed by arranging in a line a plurality of punching tools (not shown in the drawing), each of which consists of a punch and a die. As is illustrated in FIG. 8, metal plates 43 of, for instance, 3 mm-thick stainless steel are fed one after another to these punching tools and punched into various shapes. As a result of a combination of piercing, contour punching and notching, the cell electrode plate 42 as illustrated in FIG. 9 is formed, having along its length a plurality of notch slits 41 with thorns T and a plurality of retaining holes P arranged at a pitch which corresponds to the width of the collector cells 40 (for instance about 20 mm).

In forming the notch slit 41, four punch dies for punching holes with the cross-sectional shape of a short slit (for instance a short slit S approximately 7 mm long, approximately 1 mm wide and rounded at both ends), and one punch die for punching notches with the cross-sectional shape of a wedge are prepared. The punch dies for punching holes are arranged two each in a straight line separated from one another by a prescribed distance (roughly the length of one approximately 7 mm-long short slit S), and alternately in two rows front and rear. The short slits S made by the four punch dies in the metal plate 43 are then combined as illustrated in FIG. 8 to form a long slit LS, after which the punch die for punching notches is used to punch out the shape of an isosceles triangle in the strip of the metal plate 43 between its upper edge, as illustrated in the drawing, and the upper end of the long slit LS, also as illustrated in the drawing. It should be pointed out that in order to create the thorns on both sides of the notch slits 41 it is important to ensure that the shape of the ends of the short slits S, which is the cross-sectional shape of the punch dies for punching holes, is rounded (semi-circular or oblong) or tapers like a triangle: a square end section will fail to produce the thorns T.

In other words, each of the punch dies for punching holes forms a short slit S, which is for instance approximately 7 mm long, approximately 1 mm wide and rounded at both ends as in FIG. 8. Four of these short slits S arranged in a straight line with their rounded ends overlapping form the long slit LS. The thorns T are formed in pairs by the fact that a thorn-shaped section remains uncut at both ends of each short slit S because the rounded end of one short slit and that of the next one overlap in opposite directions to each other (and consequently the rounded ends overlap only partially). Thus a facing pair of thorns T is created at the points where the notch slit 41 is narrowest (for instance 0.295 μm). Moreover, a further pair of facing thorns is created where the head of the guide notch D, which is shaped in the form of an isosceles triangle, overlaps with the end of the long slit LS. Thus, there are four narrowest points in this example where thorns T are formed. The dimension of the notch slit 41 at its narrowest point should preferably be about 3–20 μm less than the thickness of the cell electrode plate 42 (for instance 0.3 mm). For the sake of convenience when assembling the collector cells 40, the total length of the notch slit 41 is roughly half the height of the cell electrode plate.

As is also shown in FIG. 8, the retaining holes P are punched out at the same time as the long slits LS are created, and are located one each along the lower edge of the metal plate 43 as illustrated in the drawing on a line extending from the long slits LS. The distance from the lower edge of the cell electrode plate 42 as illustrated in the drawing to the centre of each retaining hole P is roughly the same as the distance from the upper edge of the cell electrode plate 42 as illustrated in the drawing to the first thorn T.

Using a large number of cell electrode plates 42 which have been formed in this way, a large number of collector cells 40 is assembled. For this purpose first, as FIG. 11 shows, a plurality of collector cells 40 is divided into two groups G1, G2 for vertical and horizontal alignment respectively. Next, as may be seen from FIGS. 12 and 13, the cell electrode plates 42 of the vertically aligned group G1 are interlocked with the cell electrode plates 42 of the horizontally aligned group G2 at an angle of 100–175 degrees (FIG. 12 shows an example of an angle of 100 degrees, FIG. 13 of 175 degrees), and then adjusted into a rectangle to form a large number of collector cells 40 arranged in a rectangular lattice shape as in FIG. 14.

What is important here is the fact that in this example there are numerous thorns T in the notch slits 41. Where these thorns T are, the width of the slit is about 3–20 μm less than the thickness of the cell electrode plates 42, so that if initially the cell electrode plates 42 intersect at right-angles, it is impossible to make them interlock however much force is applied vertically because the notch slits will not yield lengthwise. However, if the two groups of cell electrode plates G1, G2 are pressed together with the notch slits at an angle of 100–175 degrees to each other as described above, the thorns T easily yield perpendicularly to the surface of the cell electrode plates 42, and can be made to interlock simply without the need for any great pressure. Once they have interlocked, it is an easy matter to adjust them so that they intersect at right-angles because the thorns T easily yield perpendicularly to the surface of the cell electrode plates 42.

Thus, configuring the collector cells 40 according to this example means that it is more difficult for them to become distorted as a result of accidental external forces because, as FIG. 15 shows, not only are there thorns T in the notch slits 41 where the heads of the guide notches D and the semi-circular ends of the long slits LS overlap, but there are numerous thorns T inside the long slits LS also, so that the retention effect of the thorns T comes into play. In other words, their resistance to shock is improved.

In this way the configuration of this embodiment makes it possible to combine the needle electrode 27 and the deflecting electrode 28 with the use of impact alone, and without relying on welding, a fact which makes the operation both simple and quick. This in turn makes it possible to reduce costs and facilitates mass-production. Moreover, the fact that numerous thorns are provided in the slit sections of the collector cells means that it is more difficult for them to become distorted because the retention effect of these thorns comes into play. It should be added that the presence of numerous thorns is no impediment to simplicity and does not hinder mass-production provided that the method of manufacture outlined in this example is followed.

The above is a detailed description of an embodiment of the present invention with reference to the drawings. However, the configuration is not restricted to this embodiment, and the invention may be taken to include modifications of design so long as they do not deviate from the purport of the invention. For example, it is possible to alter the shapes and numbers of the needle electrodes, collector cells, notch slits and thorns.

Figure 16:
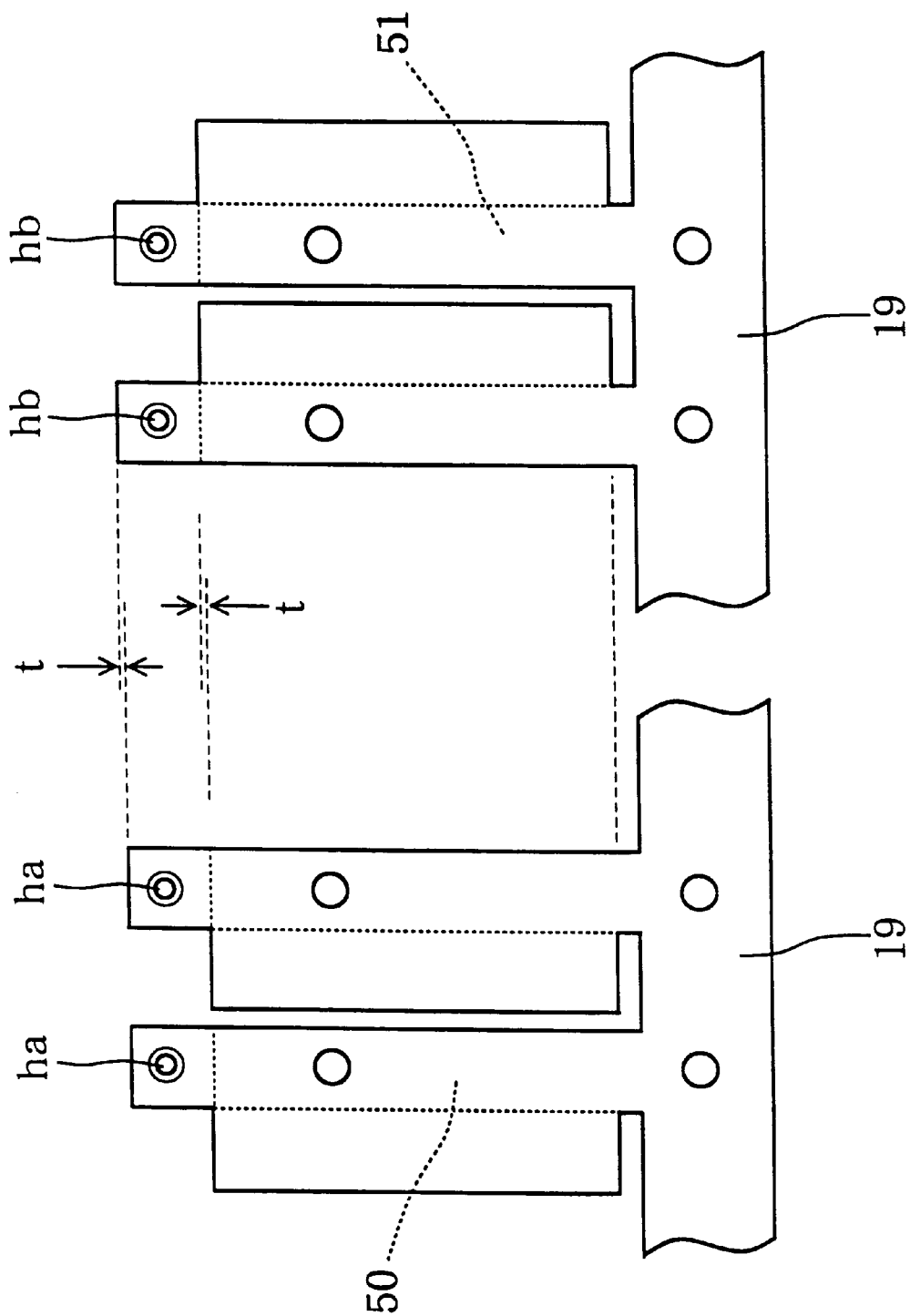
FIG. 16 is a top view which illustrates a collector cell pertaining to a modification of the same embodiment.
Figure 17:
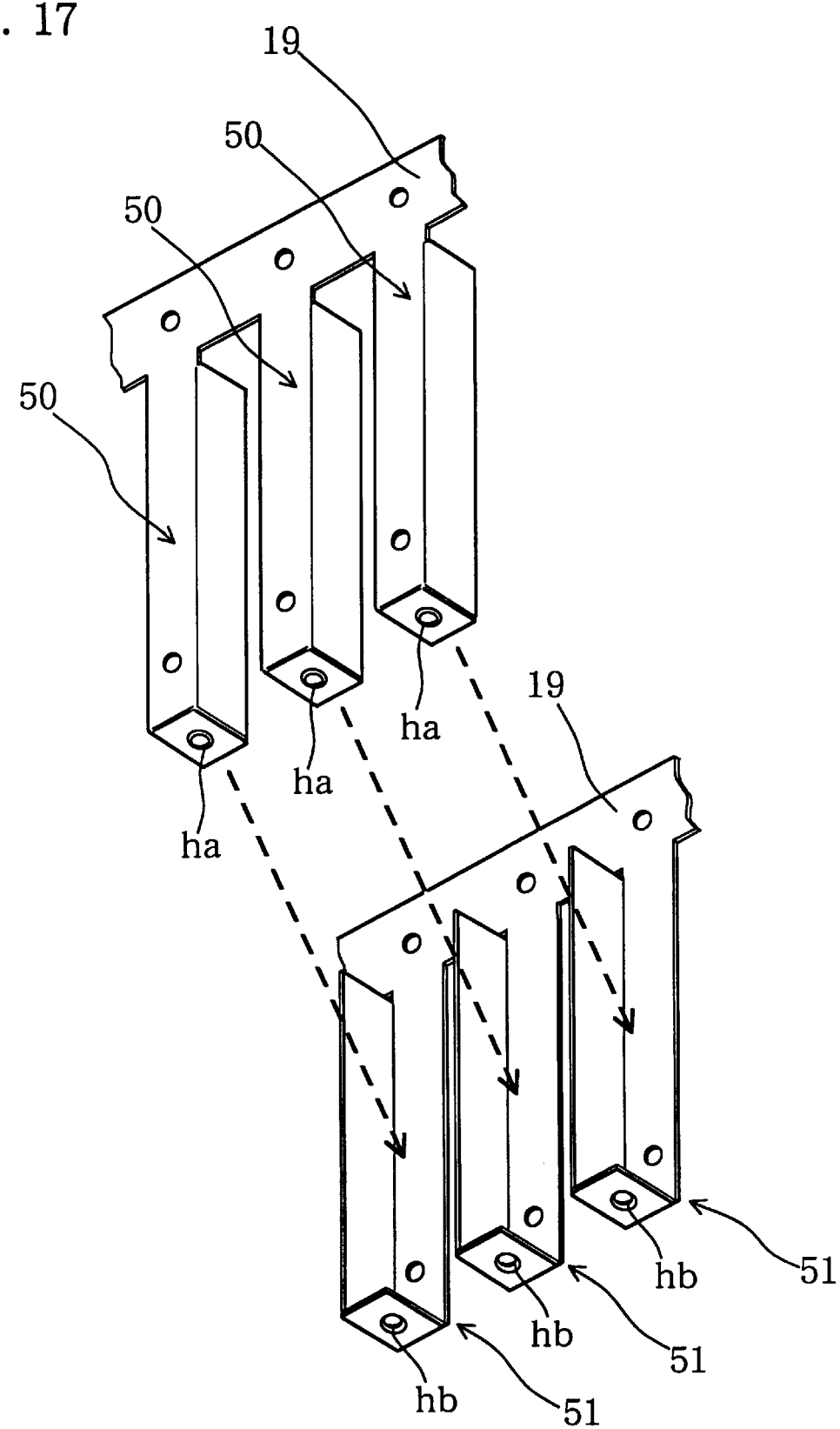
FIG. 17 is an oblique view which illustrates the same collector cell.

Moreover, the above embodiment employs deflecting electrodes configured from folded plate electrode members 30, 31 in the shape of a valley with a flat bottom and sides at right-angles to it, but is not restricted to these. For instance, angle-type folded plate electrode members 50, 51 as illustrated in FIGS. 16 and 17 may be used. Furthermore, the plate electrode members which form the deflecting electrodes are not restricted to folded plates, but may also be flat or curved plates, and one set need not employ only two members, but may also employ three or more.

Figure 18:
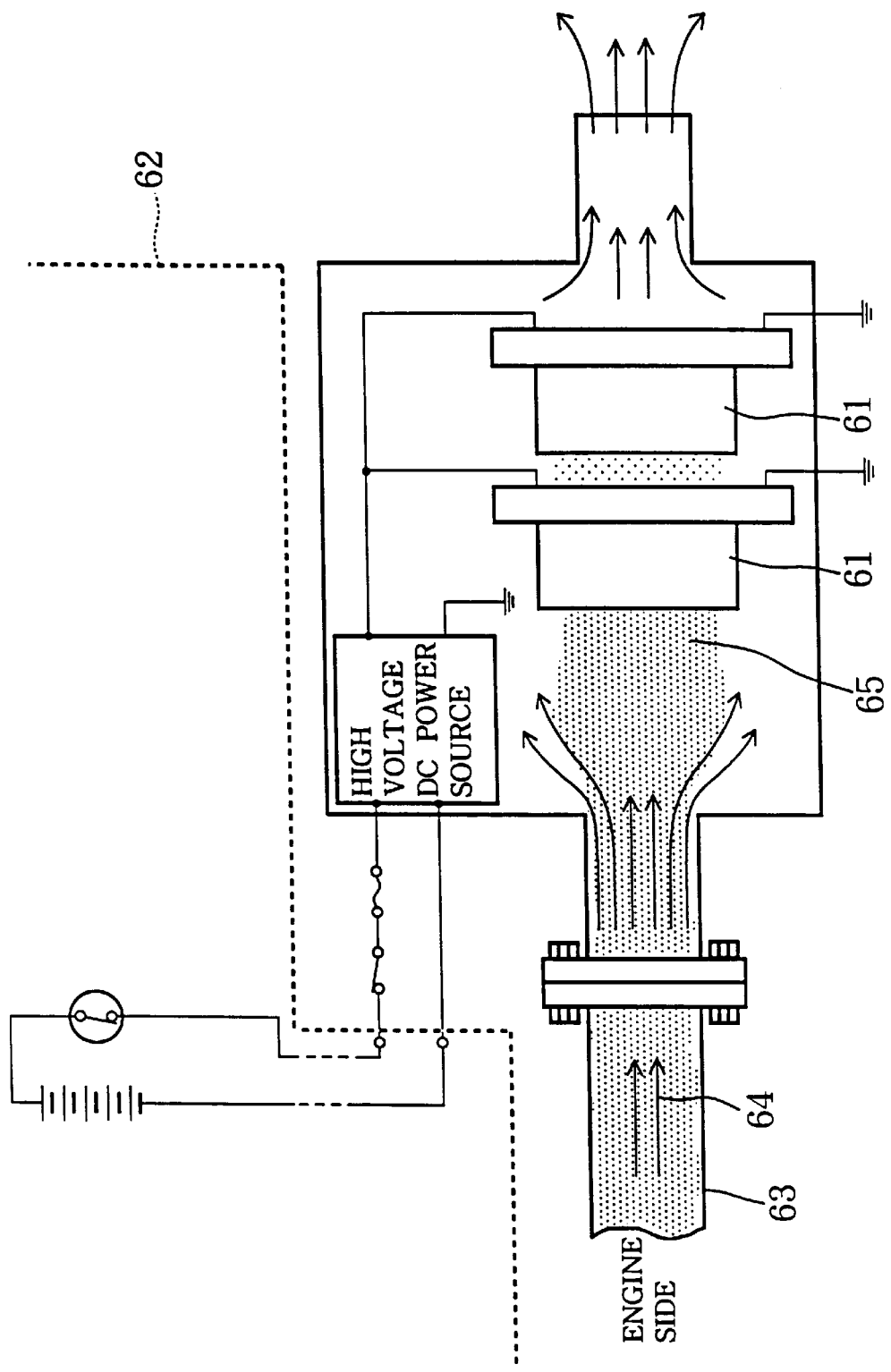
FIG. 18 is a drawing which illustrates another adaptation of the same embodiment.
Figure 19:
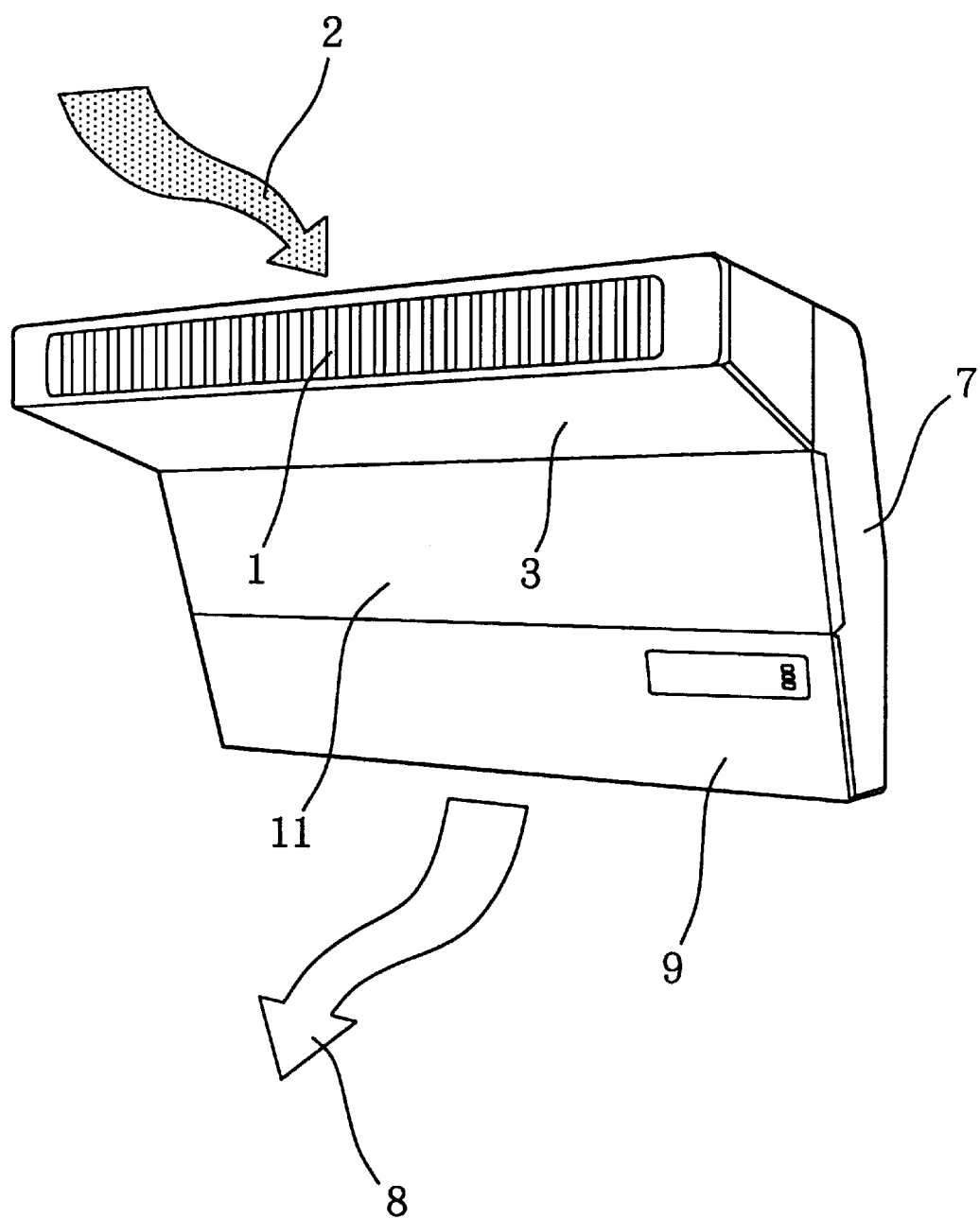
FIG. 19 is an oblique view showing the external appearance of an air-cleaner which operates by the needle discharge method.
Figure 20:
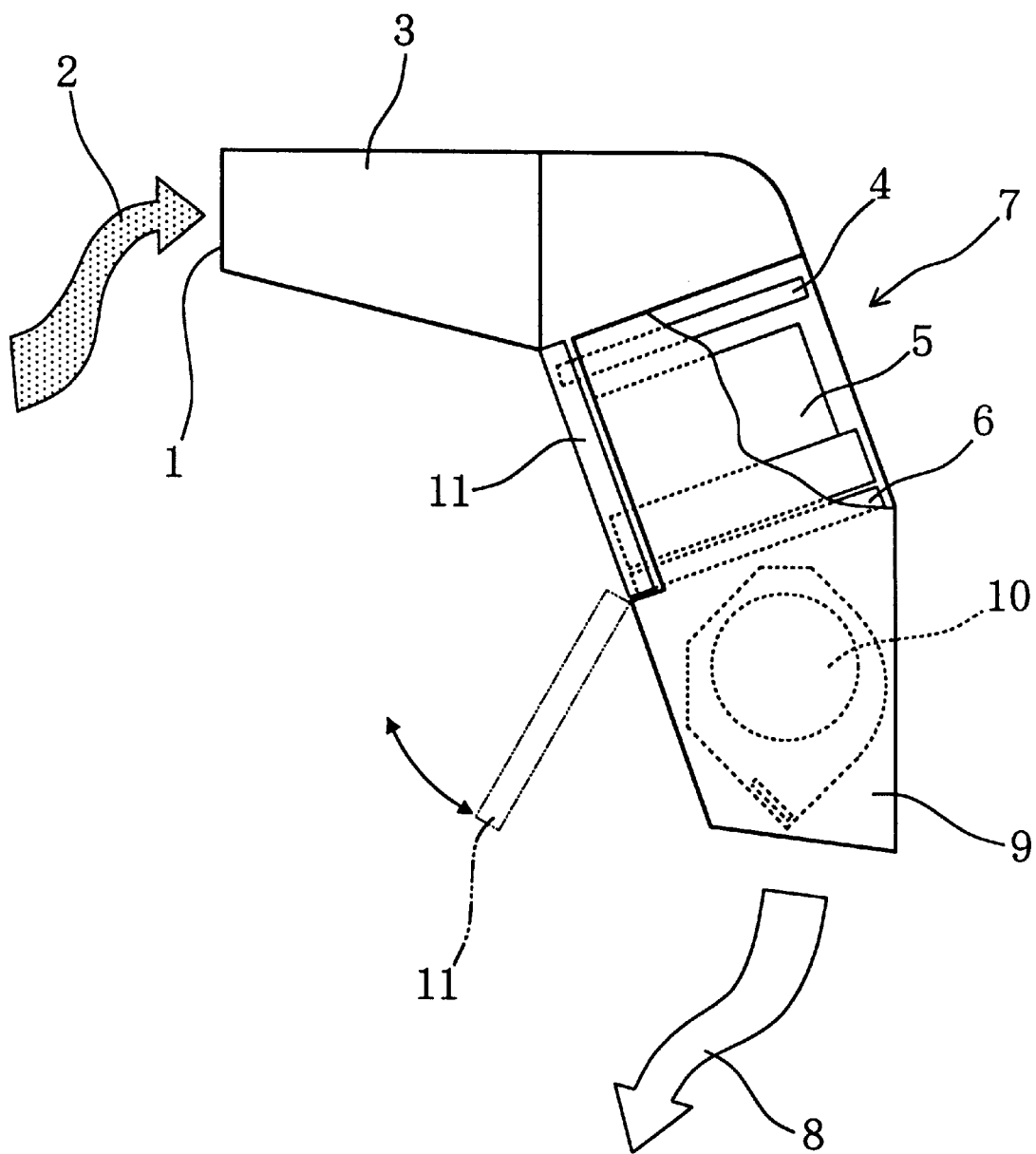
FIG. 20 is a side view of the same air-cleaner which is partially cut away.
Figure 21:
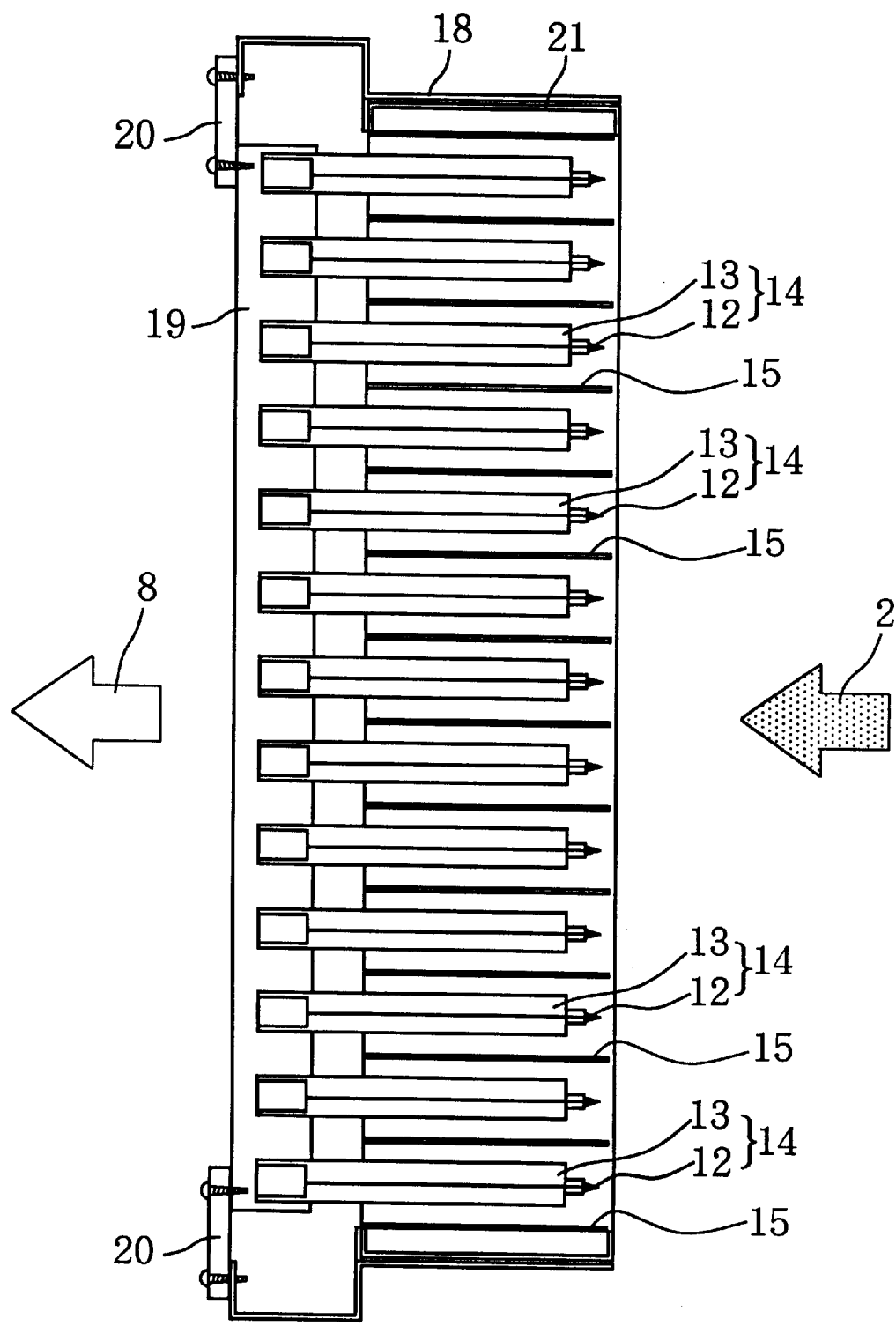
FIG. 21 is a longitudinal cross-section illustrating the structure of the electric dust-collection unit which forms the principal part of the same air-cleaner.
Figure 22:
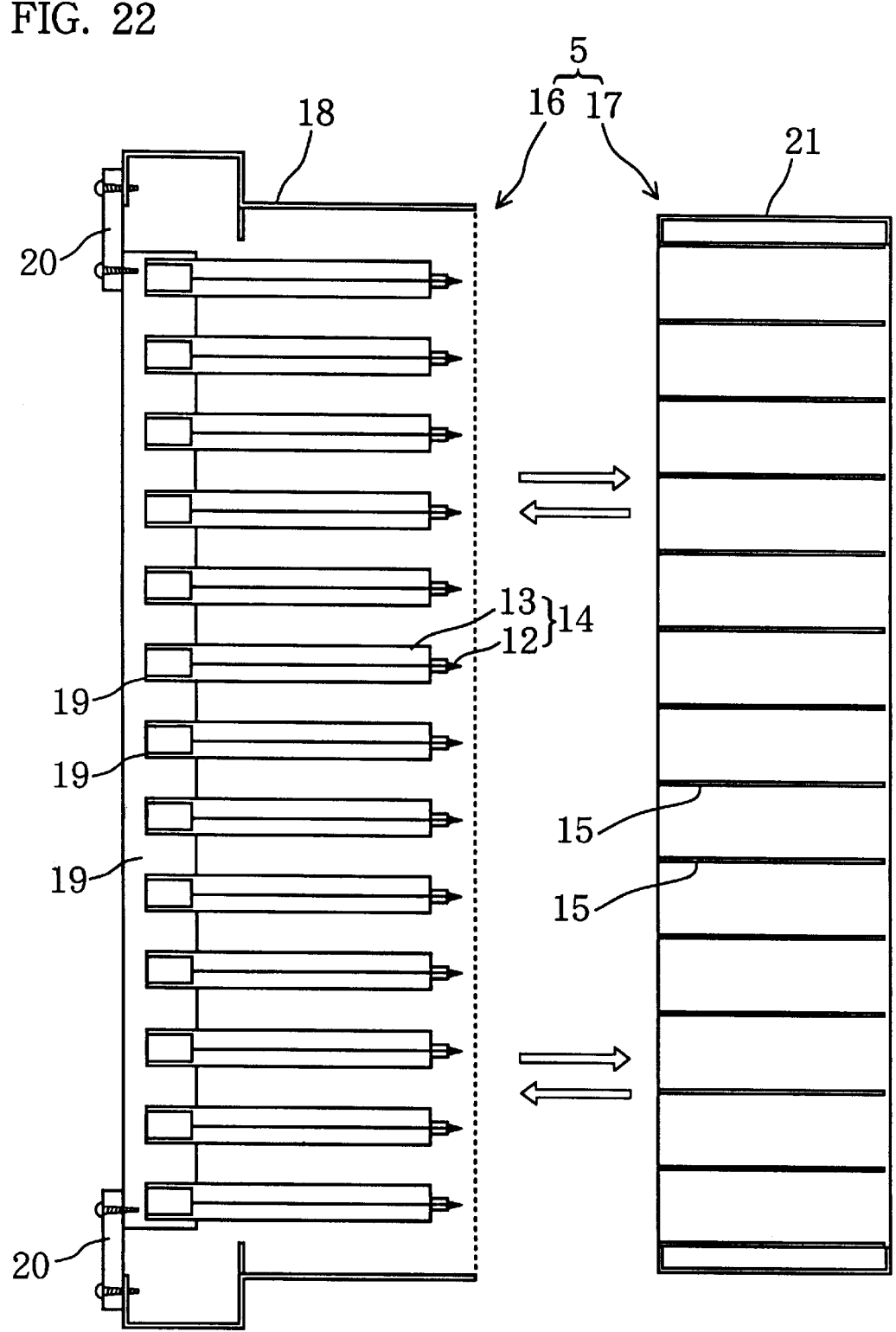
FIG. 22 is a longitudinal cross-section showing the electric dust-collection unit separated into sub-units.
Figure 23:
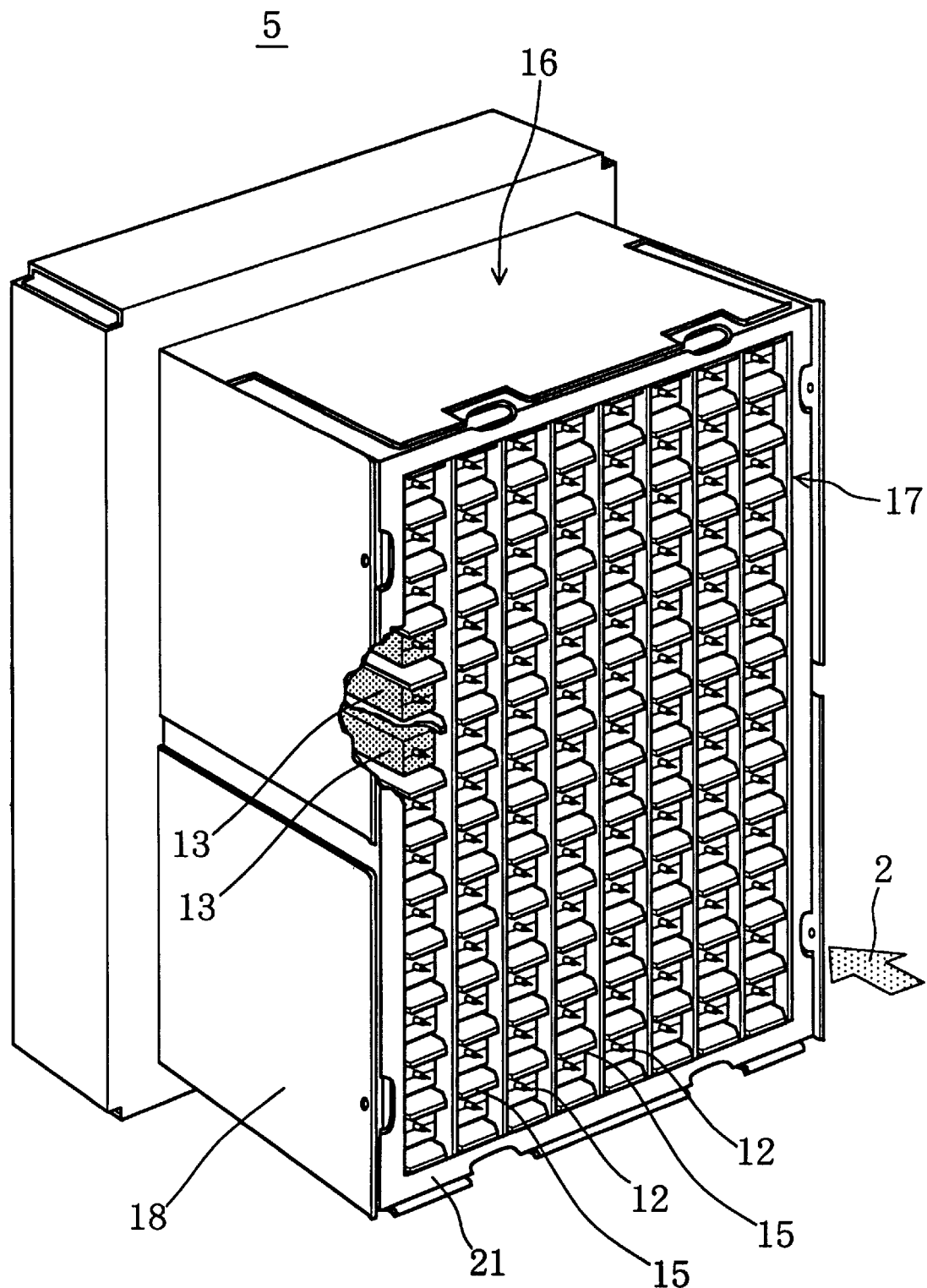
FIG. 23 is an oblique view of the electric dust-collection seen from the front (the side from which the air is sucked in)
Figure 24:
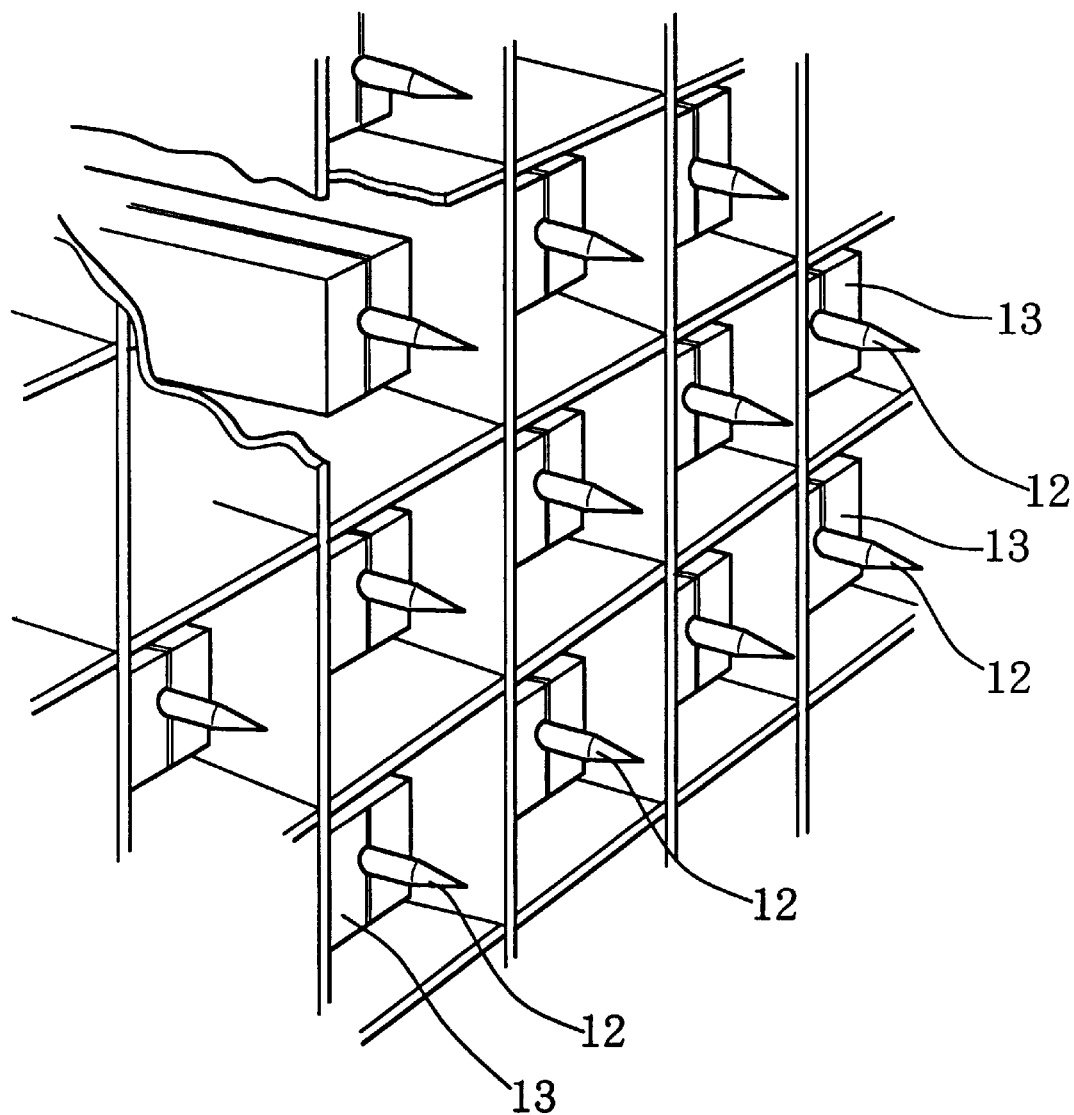
FIG. 24 is an enlarged oblique view of part of FIG. 23.
Figure 25:
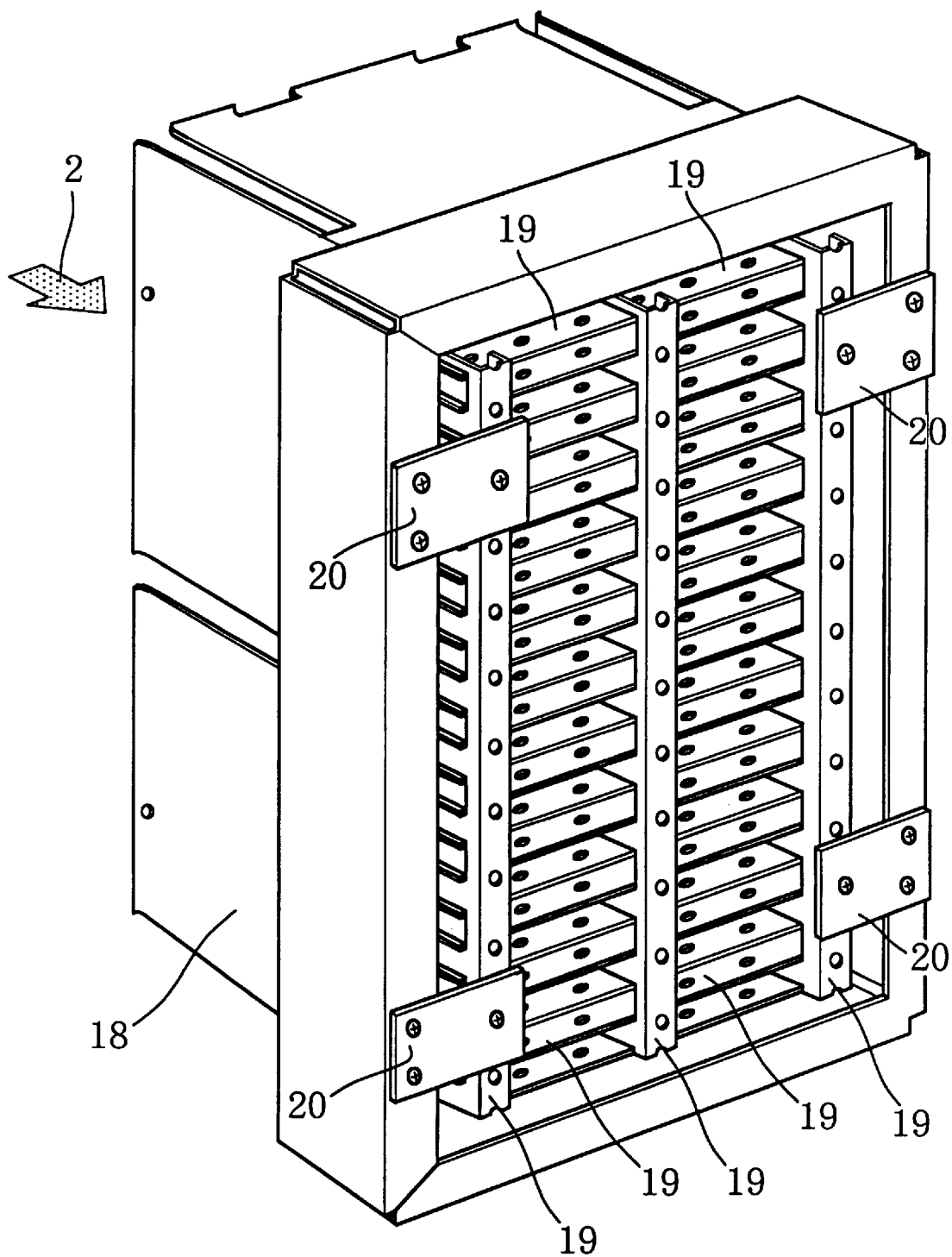
FIG. 25 is an oblique view of the electric dust-collection seen from the rear (the side on which the air is expelled)
Figure 26:
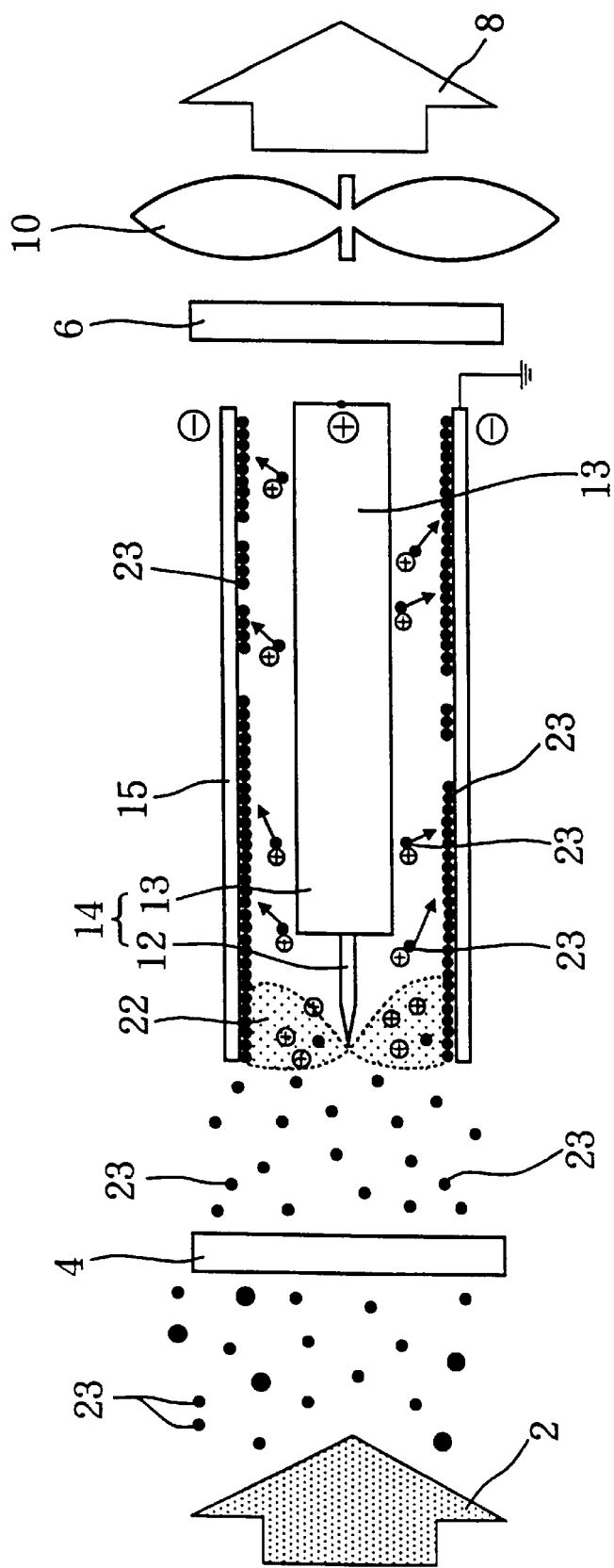
FIG. 26 is a notional drawing which illustrates the action of the air-cleaner.
Figure 28:
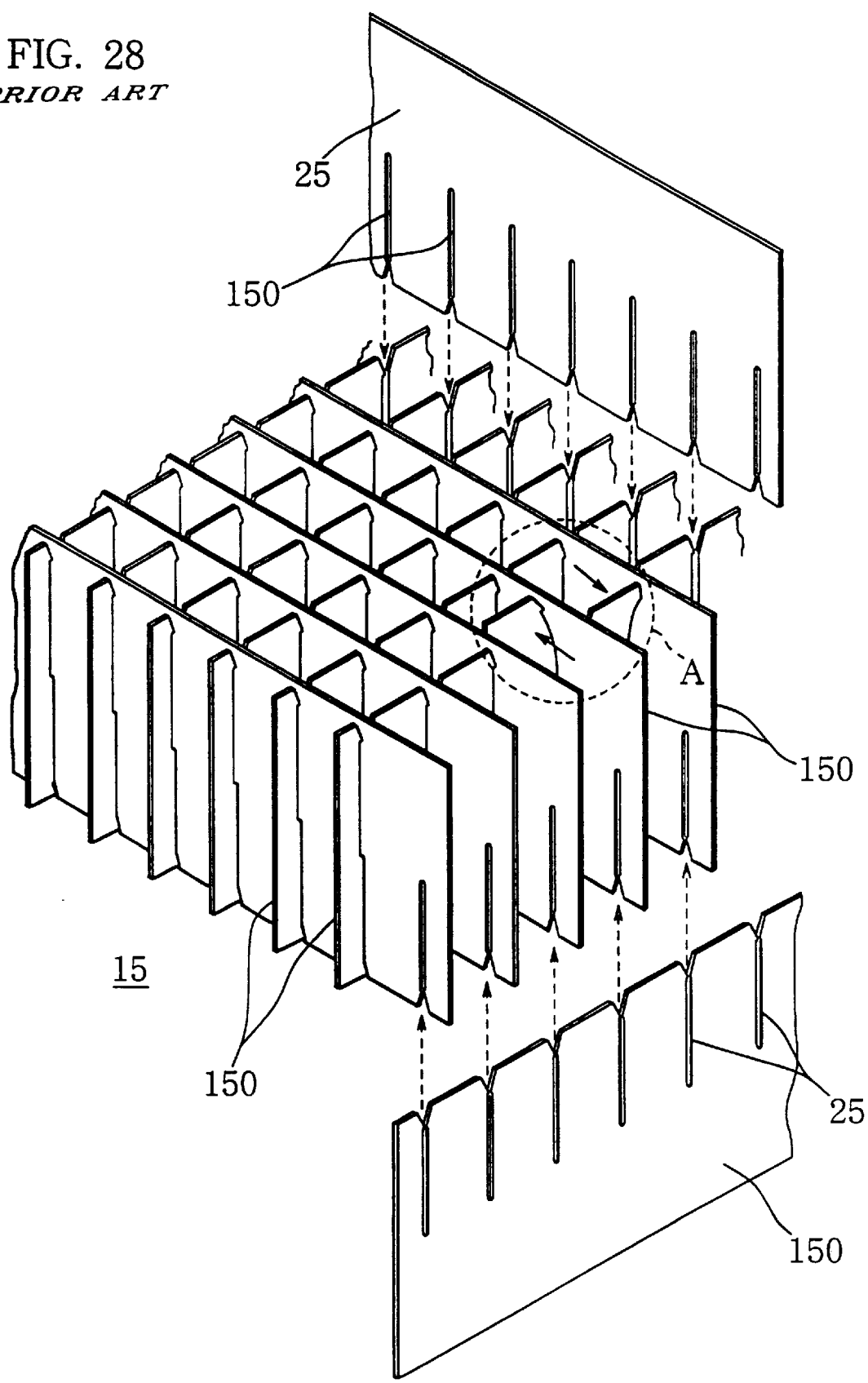
FIG. 28 is an oblique view which demonstrates typically the conventional method of manufacture of collector cells, and the problem inherent therein.

In addition, the above embodiment describes the electric dust-collection unit to which the present invention pertains as mounted in an air-cleaner for office use, but it is not restricted to this, and may also be mounted, for instance, in electric dust-collection devices installed in factories and other places which are contaminated with oil-mist. What is more, as FIG. 18 demonstrates, it may also be mounted as electric dust-collection units 61 to an exhaust smoke removal device fitted to the engine exhaust passage of a diesel vehicle 65 in order to collect carbon particulates (smoke) within the exhaust 64.

What is claimed is:

1. An electric dust-collection unit, comprising:

a needle electrode having a tip and a body and constructed to charge particulates within the air by creating corona discharges around said tip;

a collector electrode arranged in a tubular shape so as to correspond to said needle electrode and constructed to attract and collect the charged particulates by means of static electricity; and, a deflecting electrode inserted within said collector electrode for imparting to the charged particulates a deflecting force of moving towards said collector electrode, wherein said deflecting electrode comprises a first folded plate electrode member including a first forward plate section having a first mounting hole for fixedly securing said needle electrode and first side plate section facing said collector electrode in a spaced relation thereto, and a second folded plate electrode member including a second forward plate section having a second mounting hole for fixedly securing said needle electrode and second side plate section facing said collector electrode in a spaced relation thereto; and wherein said needle electrode is assembled in the form of a hollow rectangular column, said first and second forward plate sections being caused to overlap in such a way that said first and second mounting holes share substantially the same axis; and said needle electrode is fixed to said first and second forward plate sections of said deflecting electrode with the use of impact in such a way that said tip protrudes from surfaces of said first and second forward plate sections, while said body thereof is intimately fitted in said first and second mounting holes.

2. An electric dust-collection unit according to claim 1, wherein each of said first and second side plate sections has a channel-shaped cross-section, said deflecting electrodes configured in the shape of a hollow rectangular column being formed by assembling said first and second side plate sections so as to face each other.

3. An electric dust-collection unit, comprising:

a plurality of needle electrodes having a tip and a body and constructed to charge particulates within the air by creating corona discharges around said tip;

a plurality of collector electrodes arranged in a tubular shape so as to correspond to said needle electrodes and constructed to attract and collect the charged particulates by means of static electricity; and, a plurality of deflecting electrodes each configured in the form of a column and inserted within said collector electrodes for imparting to the charged particulates a deflecting force of moving towards said collector electrodes, wherein said collector electrodes are arranged as a whole in a rectangular lattice shape by causing pluralities of first and second flat plate electrode members each having a plurality of notch slits at equal distances from one another to interlock at said notch slits in such a way as to intersect with one another at right-angles; and each notch slit comprises a narrow slit section which is the site of said interlocking, and a notch guide section which acts as a guide into said slit section, there being formed at least on the edge between one end and the other of said slit section one or more thorns which cause the width of said slit at that point to be narrower than the thickness of said flat plate electrode member.

4. An electric dust-collection unit according to claim 3, wherein the narrowest points where said t horns are present in said slit sections are approximately 3–20 µm narrower than the thickness of said flat plate electrode member.

5. An electric dust-collection unit according to either one of claims 1 or 3, wherein said electric dust-collection unit comprises a female sub-unit having a large number of said collector electrodes arranged in a lattice shape, and a male sub-unit having large numbers of needle electrodes and deflecting electrodes arranged in a one-to-one correspondence with said collector electrodes, said female and male sub-units being fitted together in such a way as to be capable of being attached and detached.

6. An air-cleaning apparatus comprising a device casing having an air inlet and an air outlet and an electric dust-collection unit according to claim 5 mounted therein.

7. An air-cleaning apparatus according to claim 6, wherein said dust-collection unit is housed in such a way that it is capable of being attached to and detached from said device casing.

8. An electric dust-collection device having an electric dust-collection unit according to claim 5, mounted within a device casing having an air inlet and an air outlet.

9. An electric dust-collection device according to claim 8, wherein said dust-collection unit is housed in such a way that it is capable of being attached to and detached from said device casing.

10. An exhaust particulate collection device having an exhaust inlet and an exhaust outlet, being provided with a device casing capable of housing said dust-collection unit, and having at least said exhaust inlet fitted to the exhaust passage of a diesel engine in such a way as to collect particulates within the exhaust by means of electrical control, wherein said exhaust particulate collection device has an electric dust-collection unit according to claim 5 mounted within a device casing having said exhaust inlet and exhaust outlet.

11. An exhaust particulate collection device according to claim 10, wherein said dust-collection unit is housed in such a way that it is capable of being attached to and detached from said device casing.

\* \* \* \* \*